United States Patent
Ebata et al.

(10) Patent No.: US 6,781,979 B1
(45) Date of Patent: Aug. 24, 2004

(54) CONNECTION CONTROL DEVICE, CONNECTION CONTROL METHOD AND DATA COMMUNICATION SYSTEM

(75) Inventors: Koichi Ebata, Tokyo (JP); Kenji Takeda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/517,532

(22) Filed: Mar. 2, 2000

(30) Foreign Application Priority Data

Feb. 2, 2000 (JP) ........................................ 2000-024985

(51) Int. Cl.$^7$ ............................. H04Q 7/24; H04Q 7/00
(52) U.S. Cl. ....................... 370/338; 370/235; 455/442; 455/445
(58) Field of Search ................................. 370/328, 338, 370/349, 352, 230–236; 455/557, 556, 555, 517, 442, 445, 403, 434, 550.1

(56) References Cited

U.S. PATENT DOCUMENTS

| | | | | |
|---|---|---|---|---|
| 5,546,382 A | * | 8/1996 | Fujino | 370/352 |
| 5,903,851 A | * | 5/1999 | Backstrom et al. | 455/557 |
| 6,169,909 B1 | * | 1/2001 | Koshino | 455/557 |
| 6,249,681 B1 | * | 6/2001 | Virtanen | 370/349 |
| 6,330,434 B1 | * | 12/2001 | Nitta | 455/403 |
| 2002/0068572 A1 | * | 6/2002 | Chun et al. | 455/442 |

* cited by examiner

Primary Examiner—Steven H. D Nguyen
(74) Attorney, Agent, or Firm—Whitham, Curtis & Christofferson, PC

(57) ABSTRACT

A connection control device for controlling data communication involving set-up of a connection provided on both sides of a communication source and a communication destination to control connection states of both sides in cooperation with a communication partner, each device controlling communication between a data terminating equipment and a data circuit-terminating equipment on its side, including connection holding means for holding the state of an established connection after a disconnection of a physical line, communication resuming means for resuming communication by a held connection after a re-connection of a physical line, control means for processing a transition of said connection states, a control message communication means for transmitting and receiving information of a communication partner and information of a transition of the connection states to and from the communication partner as a control message, and information storage means for storing information of a communication partner and information of a connection with said communication partner.

28 Claims, 12 Drawing Sheets

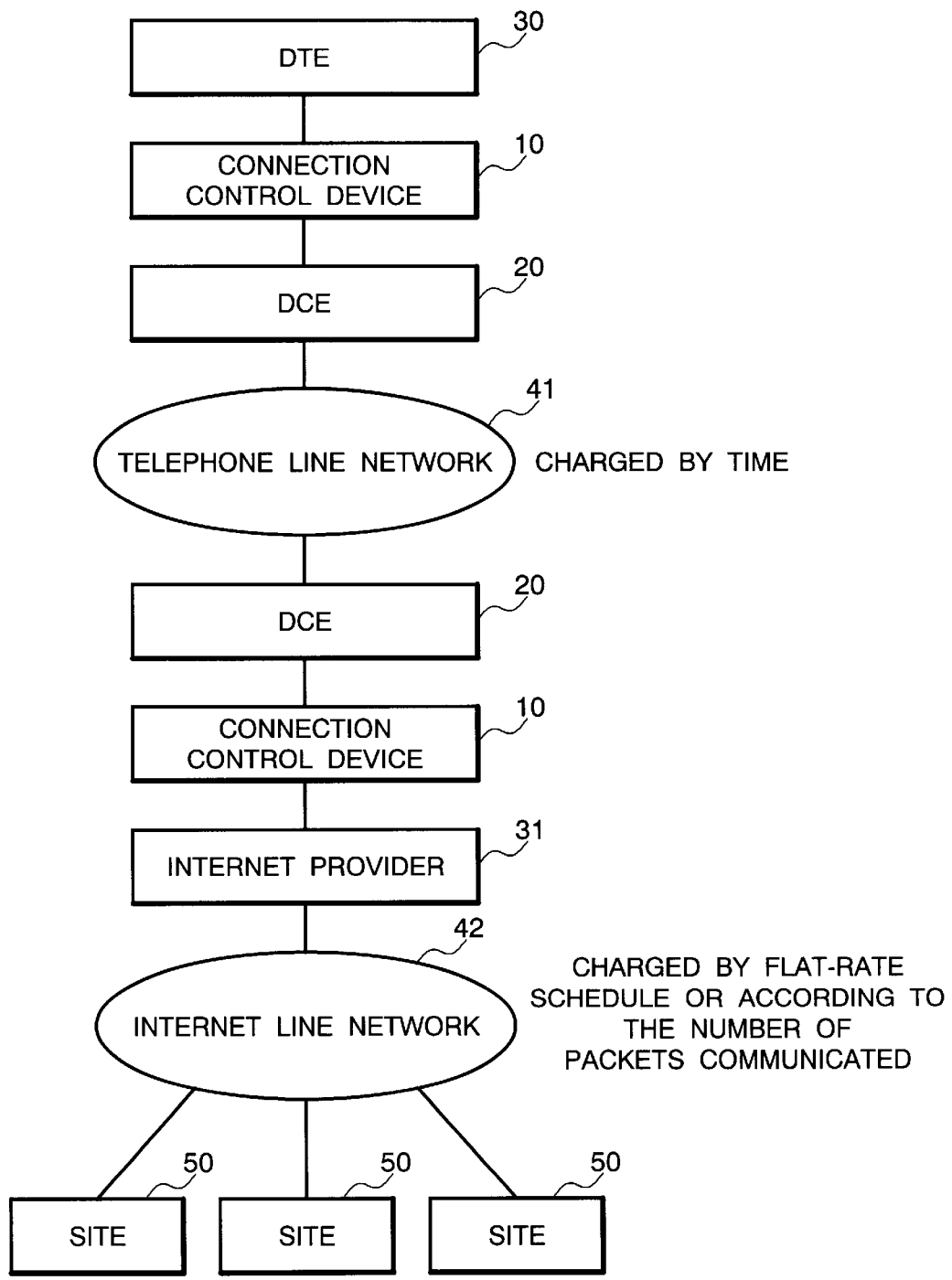

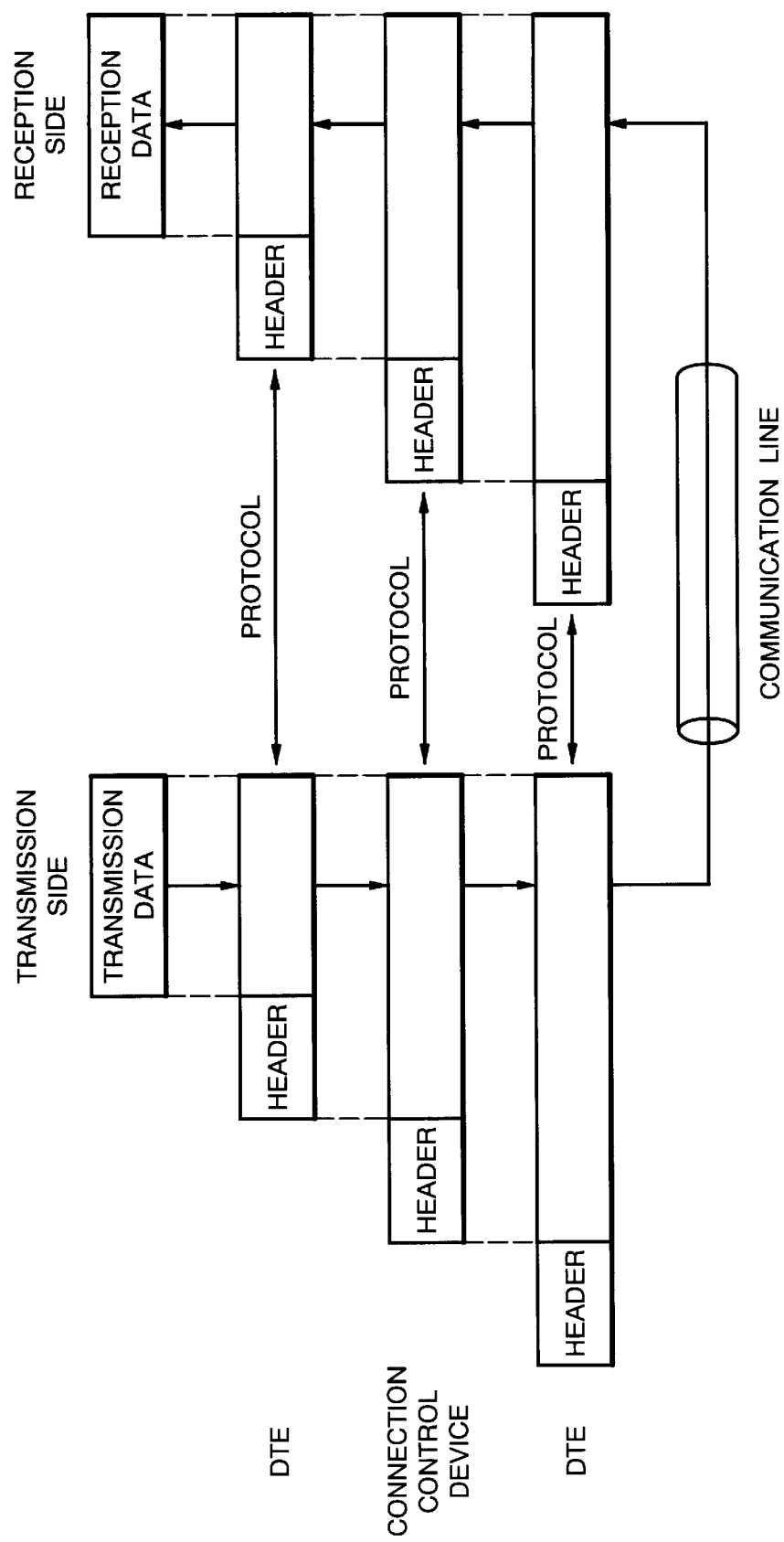

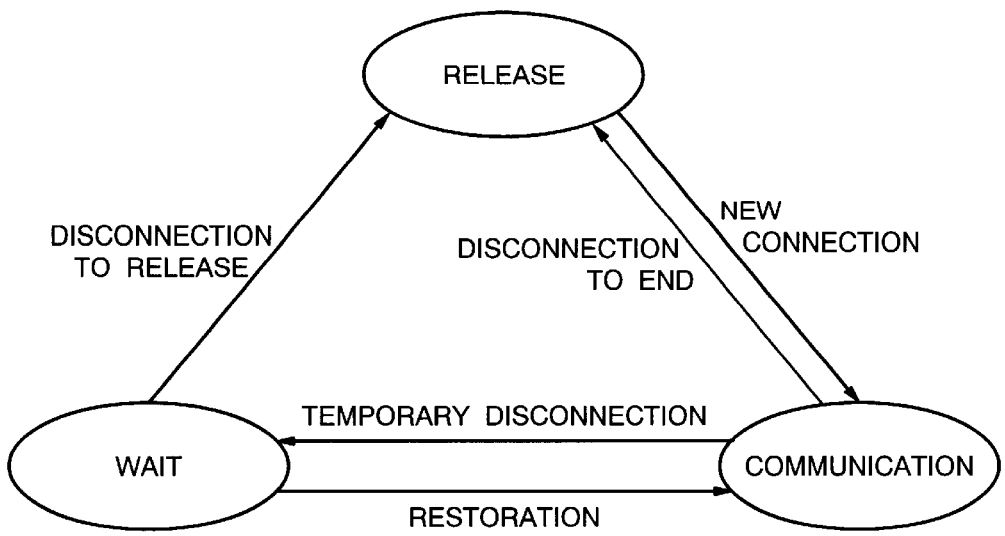

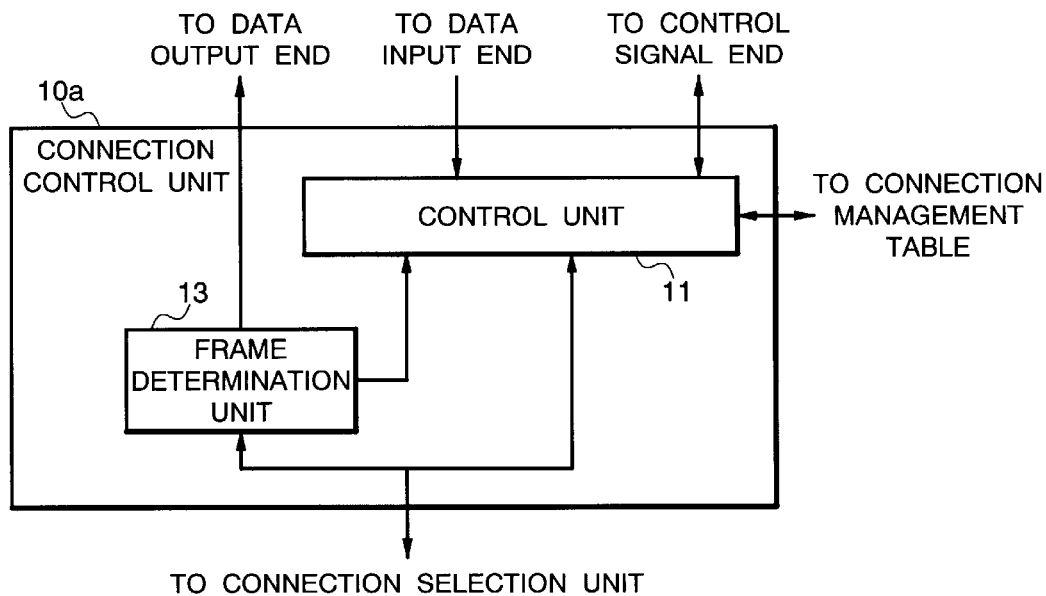

CONNECTION CONTROL DEVICE, CONNECTION CONTROL METHOD AND DATA COMMUNICATION SYSTEM

BACKGROUND OF THE INVENTION

1. Field of the Invention

The present invention relates to connection control for controlling logical and physical connections of data communication and, more particularly, to a connection control device, a connection control method, a recording medium which records a connection control program and a data communication system enabling more efficient communication on a line switching system.

2. Description of the Related Art

Among communication systems for a data communication network such as the internet, most commonly employed is the packet exchange system. On the other hand, for a user to use a data communication network, commonly done is connecting to a provider or the like based on the line switching system using telephone lines.

Line switching system, which is one of switching modes for use in data transmission, is a switching system in which between a transmission side DTE (Data Terminating Equipment) which transmits information and a reception side DTE, a physical communication path is set up for every communication to transmit and receive data. The communication path set up here allows no other user to use and accordingly, a communication charge is ordinarily fixed according to a time period of line use.

In recent years, frequent mode of use is using a data communication network such as the internet from a data terminating equipment by means of a portable communication device outdoors and even in this case, connection to the data communication network is made through a radio telephone line of the line switching system using a portable telephone, personal handyphone system (PHS) or the like.

For making a connection to a data communication network by using the line switching service of a mobile communication network, employed is a dial-up server for the relay to a packet exchange network which terminates connections made by line switching. The dial-up server is in some cases disposed within a mobile communication network.

For making a connection to the internet from a mobile communication terminal, it is a common practice to, after making a connection to a dial-up server using telephone services and establishing a link by means of the PPP(Point to Point Protocol; RFC 1661) which is a layer 2 protocol (data link protocol), use the TCP/IP (Transmission Control Protocol/Internet Protocol) which is a higher-order protocol.

As to connection/disconnection between a mobile communication terminal and a dial-up server, telephone connection and PPP link are established upon a request from a user using the mobile terminal device. PPP monitors a state of a line and when the line is disconnected while a link is being established, ends the link.

In such mobile communication, however, propagation environments are often unstable to cause line disconnection. In data communication and the like using a mobile communication terminal, therefore, a once established logical line link is in many cases released (disconnected) as a physical line is disconnected.

As described in the foregoing, conventional connection control devices have the following problems.

First problem is wasteful consumption of telephone line resources such as radio resource.

The reason is that in data communication employing the line switching system, as described above, connection of a telephone line is continued from a connection request until a disconnection request made by a user similarly to a case of voice communication, thereby exclusively using the line while no data is transmitted thereon.

Telephone line resources such as radio resources are shared by numbers of users and affect a capacity of the entire system, and lack of line resources causes a problem that a new connection can not be made by other users.

In addition, it is a common practice in the line switching system to fix charges of use according to a time period of line use and even a connection time when data is actually neither sent nor received is charged, which is uneconomical for users.

Second problem is that when a line is disconnected due to some reason or other during communication, data communication should be ended halfway to conduct all the procedures for connection all over again from the beginning, which is inefficient and laborious operation.

Thirdly, in mobile communication, line disconnection often happens as mentioned above and every time the line disconnection occurs, a PPP link ends. Then, when communication is to be made with the same connection destination again such as in a case where desired data communication is yet to be completed, a user needs to make a connection request again to establish a PPP link.

Also in communication using the TCP such as the internet, when an interruption occurs, a TCP connection is released, so that data communication should be made over again starting with a connection and set-up of the connection.

SUMMARY OF THE INVENTION

An object of the present invention is to make efficient use of communication resources in data communication employing line switching, as well as providing environments convenient for users and efficient data communication.

According to the first aspect of the invention, a connection control device for controlling data communication involving set-up of a connection provided on both sides of a communication source and a communication destination to control connection states of both sides in cooperation with a communication partner, each the device controlling communication between a data terminating equipment and a data circuit-terminating equipment on the side the device is disposed, comprising:

connection holding means for holding the state of an established connection after a disconnection of a physical line, and communication resuming means for resuming communication by the connection held after a re-connection of a physical line.

In the preferred construction, wherein the state of a connection with a communication partner has three kinds of:

a release state indicative of a state where a physical line is disconnected and a connection is released, a communication state indicative of a state where a physical line is connected and a connection is established, and a wait state indicative of a state where a physical line is disconnected while holding a connection, and which further comprises control means for processing a transition of the connection states.

In another preferred construction, the connection control device further comprises a control message communication means for transmitting and receiving information of a communication partner and information of a transition of the connection states to and from the communication partner as a control message, wherein when receiving an instruction of a kind designated for controlling a connection of communication from the data terminating equipment, the control message communication means transmits the control message indicative of information of the instruction in question to the communication partner prior to execution of the instruction.

In another preferred construction, the connection control device further comprises information storage means for storing information of a communication partner and information of a connection with the communication partner, wherein every time a new connection is established, the information storage means stores information of a communication partner having the connection in question and information of the connection in question.

In another preferred construction, when at the communication state, a physical line is disconnected without receiving a notification of a communication disconnection by the control message from a communication partner, information stored in the information storage means is held as it is to make a transition to the wait state without executing processing of communication end by a disconnection of a physical line with respect to the data terminating equipment.

In another preferred construction, the connection control device further comprises a timer for determining a lapse of a fixed time, wherein when no transmission and reception of communication data lasts longer than a fixed time in succession to and from a communication partner to which a physical line is connected, the physical line with the communication partner is disconnected and information stored in the information storage means is held as it is to make a transition to the wait state without executing processing of communication end by a disconnection of a physical line with respect to the data terminating equipment.

In another preferred construction, when at the wait state, transmission data to be sent to a waiting communication partner is received from the data terminating equipment, a physical line with the communication partner is again connected to transmit the transmission data through a waiting connection stored in the information storage means, thereby making a transition to the communication state.

In another preferred construction, when at the wait state, a connection of a physical line is received from a waiting communication partner to receive data transmitted from the communication partner, communication by a waiting connection stored in the information storage means is resumed to make a transition to the communication state.

In another preferred construction, when at the wait state, the control message communication means receives a control message notifying communication end from the communication partner, information of a waiting connection stored in the information storage means is abandoned to make a transition to the release state.

In another preferred construction, the connection control device further comprises a timer for determining a lapse of a fixed time, wherein when at the wait state, no communication with a waiting communication partner lasts longer than a fixed time before resumption, information of a waiting connection stored in the information storage means is abandoned to make a transition to the release state.

In another preferred construction, the device is connected to a plurality of data circuit-terminating equipment and further comprises server processing means for processing communication of a plurality of lines and a plurality of connections, and management table storage means for centrally storing and managing information of a communication partner and information of a connection with the communication partner with respect to all the connections, the server processing means includes means for releasing resources of the data circuit-terminating equipment related to the communication in question at a transition to the wait state, and means for referring to the management table storage means to search for the data circuit-terminating equipment not in use, thereby conducting connection control for each of the plurality of connections.

In another preferred construction, when receiving a control message of a restoration request from a communication partner having a waiting connection, the server processing means searches the management table storage means for information of the connection of the communication partner and resumes communication by the searched connection.

In another preferred construction, the device is internally provided with a function of the data circuit-terminating equipment.

In another preferred construction, the device is integrated with the data terminating equipment into one unit.

In another preferred construction, the device is a separate unit from the data terminating equipment and the data circuit-terminating equipment.

In another preferred construction, the device controls radio data communication.

According to the second aspect of the invention, a connection controlling method of controlling data communication involving set-up of a connection, wherein on both sides of a communication source and a communication destination for controlling connection states of both sides in cooperation with a communication partner, communication is controlled between a data terminating equipment and a data circuit-terminating equipment on each side, and the method comprises the steps of:

connection holding of holding the state of an established connection after a disconnection of a physical line, and communication resuming of resuming communication by the connection held after a re-connection of a physical line.

In the preferred construction, the state of a connection with a communication partner has three kinds of:

a release state indicative of a state where a physical line is disconnected and a connection is released, a communication state indicative of a state where a physical line is connected and a connection is established, and a wait state indicative of a state where a physical line is disconnected while holding a connection, and which further comprises the control step of processing a transition of the connection states.

In another preferred construction, the connection controlling method further comprising the control message communication step of transmitting and receiving information of a communication partner and information of a transition of the connection states to and from the communication partner as a control message, wherein when receiving an instruction of a kind designated for controlling a connection of communication from the data terminating equipment, at the control message communication step, the control message indicative of information of the instruction in question is transmitted to the communication partner prior to execution of the instruction.

In another preferred construction, the connection controlling method further comprising the information storing step of storing information of a communication partner and information of a connection with the communication partner, wherein every time a new connection is established, information of a communication partner having the connection in question and information of the connection in question are stored at the information storing step.

In another preferred construction, when at the communication state, a physical line is disconnected without receiving a notification of a communication disconnection by the control message from a communication partner, information stored at the information storing step is held as it is to make a transition to the wait state without executing processing of communication end by a disconnection of a physical line with respect to the data terminating equipment.

In another preferred construction, the connection controlling method further comprising a timer for determining a lapse of a fixed time, wherein when no transmission and reception of communication data lasts longer than a fixed time in succession to and from a communication partner to which a physical line is connected, the physical line with the communication partner is disconnected and information stored at the information storing step is held as it is to make a transition to the wait state without executing processing of communication end by a disconnection of a physical line with respect to the data terminating equipment.

In another preferred construction, when at the wait state, transmission data to be sent to a waiting communication partner is received from the data terminating equipment, a physical line with the communication partner is again connected to transmit the transmission data through a waiting connection stored at the information storing step, thereby making a transition to the communication state.

In another preferred construction, when at the wait state, a connection of a physical line is received from a waiting communication partner to receive data transmitted from the communication partner, communication by a waiting connection stored at the information storing step is resumed to make a transition to the communication state.

In another preferred construction, when at the wait state, the control message communication step receives a control message notifying communication end from the communication partner, information of a waiting connection stored at the information storing step is abandoned to make a transition to the release state.

In another preferred construction, the connection controlling method further comprising a timer for determining a lapse of a fixed time, wherein when at the wait state, no communication with a waiting communication partner lasts longer than a fixed time before resumption, information of a waiting connection stored at the information storing step is abandoned to make a transition to the release state.

In another preferred construction, with a plurality of data circuit-terminating equipment connected, the method further comprises the steps of:

server processing of processing communication of a plurality of lines and a plurality of connections, and management table storing of centrally storing and managing information of a communication partner and information of a connection with the communication partner with respect to all the connections, the server processing step including the steps of:

releasing resources of the data circuit-terminating equipment related to the communication in question at a transition to the wait state, and referring to the management table storage step to search for the data circuit-terminating equipment not in use, thereby conducting connection control for each of the plurality of connections.

In another preferred construction, when receiving a control message of a restoration request from a communication partner having a waiting connection, the server processing step searches for information of the connection of the communication partner at the management table storage step and resumes communication by the searched connection.

According to the third aspect of the invention, a computer readable memory storing a connection control program for controlling data communication involving set-up of a connection, the computer readable memory being provided on both sides of a communication source and a communication destination for controlling connection states of both sides in cooperation with a communication partner and each the connection control program controlling communication between a data terminating equipment and a data circuit-terminating equipment on each side, wherein the connection control program comprises the steps of:

connection holding of holding the state of an established connection after a disconnection of a physical line, and communication resuming of resuming communication by the connection held after a re-connection of a physical line.

According to another aspect of the invention, a data communication system for conducting data communication involving set-up of a connection, wherein communication control devices are disposed on both sides of a communication source and a communication destination for controlling connection states of both sides in cooperation with a communication partner, each controlling communication between a data terminating equipment and a data circuit-terminating equipment on each side, and the connection control device comprises:
connection holding means for holding the state of an established connection after a disconnection of a physical line, and
communication resuming means for resuming communication by the connection held after a re-connection of a physical line.

In the preferred construction, the state of a connection with a communication partner has three kinds of:
a release state indicative of a state where a physical line is disconnected and a connection is released,
a communication state indicative of a state where a physical line is connected and a connection is established, and
a wait state indicative of a state where a physical line is disconnected while holding a connection, and wherein the connection control device further comprises control means for processing a transition of the connection states.

In another preferred construction, the connection control device further comprises
control message communication means for transmitting and receiving information of a communication partner and information of a transition of the connection states to and from the communication partner as a control message,
the control message communication means, when receiving an instruction of a kind designated for controlling a connection of communication from the data terminating equipment, transmitting the control message indicative of information of the instruction in question to the communication partner prior to execution of the instruction.

In another preferred construction, the connection control device further comprises
information storage means for storing information of a communication partner and information of a connection with the communication partner, the information storage means, every time a new connection is established, storing information of a communication partner having the connection in question and information of the connection in question.

In another preferred construction, the connection control device,
when at the communication state, a physical line is disconnected without receiving a notification of a communication disconnection by the control message from a communication partner,
holds information stored in the information storage means as it is to make a transition to the wait state without executing processing of communication end by a disconnection of a physical line with respect to the data terminating equipment.

In another preferred construction, the connection control device further comprises
a timer for determining a lapse of a fixed time, and wherein the connection control device, when no transmission and reception of communication data lasts longer than a fixed time in succession to and from a communication partner to which a physical line is connected, disconnects the physical line with the communication partner and holds information stored in the information storage means as it is to make a transition to the wait state without executing processing of communication end by a disconnection of a physical line with respect to the data terminating equipment.

In another preferred construction, when at the wait state, receiving transmission data to be transmitted to a waiting communication partner from the data terminating equipment,
the connection control device again connects a physical line with the communication partner and transmits the transmission data through a waiting connection stored in the information storage means to make a transition to the communication state.

In another preferred construction, when at the wait state, receiving a connection of a physical line from a waiting communication partner to receive data transmitted from the communication partner,
the connection control device resumes communication by a waiting connection stored in the information storage means to make a transition to the communication state.

In another preferred construction, when at the wait state, the control message communication means receives a control message notifying communication end from the communication partner,
the connection control device abandons information of a waiting connection stored in the information storage means to make a transition to the release state.

In another preferred construction, the connection control device further comprises a timer for determining a lapse of a fixed time, and wherein
the connection control device, when at the wait state, no communication with a waiting communication partner lasts longer than a fixed time before resumption, abandons information of a waiting connection stored in the information storage means to make a transition to the release state.

In another preferred construction, the connection control device is connected to a plurality of data circuit-terminating equipment and further comprises:
server processing means for processing communication of a plurality of lines and a plurality of connections, and
management table storage means for centrally storing and managing information of a communication partner and information of a connection with the communication partner with respect to all the connections,
the server processing means including:
means for releasing resources of the data circuit-terminating equipment related to the communication in question at a transition to the wait state, and
means for referring to the management table storage means to search for the data circuit-terminating equipment not in use, thereby
conducting connection control for each of the plurality of connections.

In another preferred construction, when receiving a control message of a restoration request from a communication partner having a waiting connection, the server processing means
searches the management table storage means for information of the connection of the communication partner and resumes communication by the searched connection.

In another preferred construction, the system controls radio data communication.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is a block diagram showing a structure of one embodiment of a communication system using the connection control device according to the first embodiment of the present invention;

FIG. 4 is a diagram for use in explaining a hierarchical structure of communication using the connection control device according the first embodiment of the present invention;

FIG. 5 is a state transition diagram of the connection control device according to the first embodiment of the present invention;

FIG. 6 is a diagram showing one example of a control information storage unit according to the first embodiment of the present invention;

FIG. 7 is a diagram showing a control message of the first embodiment of the present invention;

FIG. 14 is a diagram showing one example of a connection management table according to the second embodiment of the present invention;

FIG. 15 is a block diagram showing a structure of a connection control unit according to the second embodiment of the present invention;

FIG. 16 is a diagram showing a control message according to the second embodiment of the present invention.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
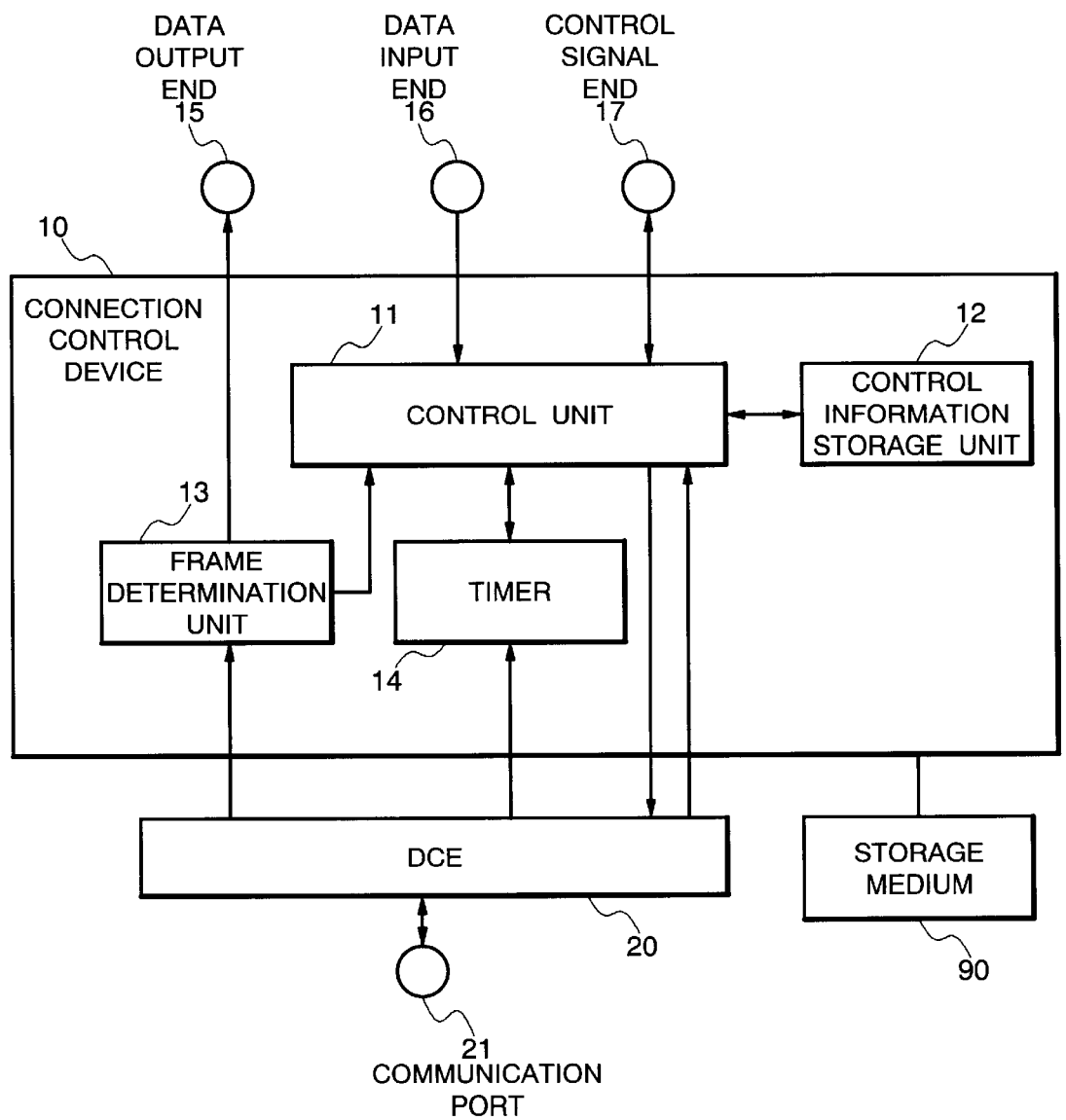
FIG. 1 is a block diagram showing a structure of a connection control device according to a first embodiment of the present invention.

Description will be made of a connection control device 10 according to a first embodiment of the present invention. FIG. 1 is a block diagram showing a structure of the connection control device 10 according to the first embodiment of the present invention, while FIGS. 2 and 3 are block diagrams each showing a structure of one embodiment of a communication system using the connection control device 10 according to the first embodiment of the present invention.

Figure 2:
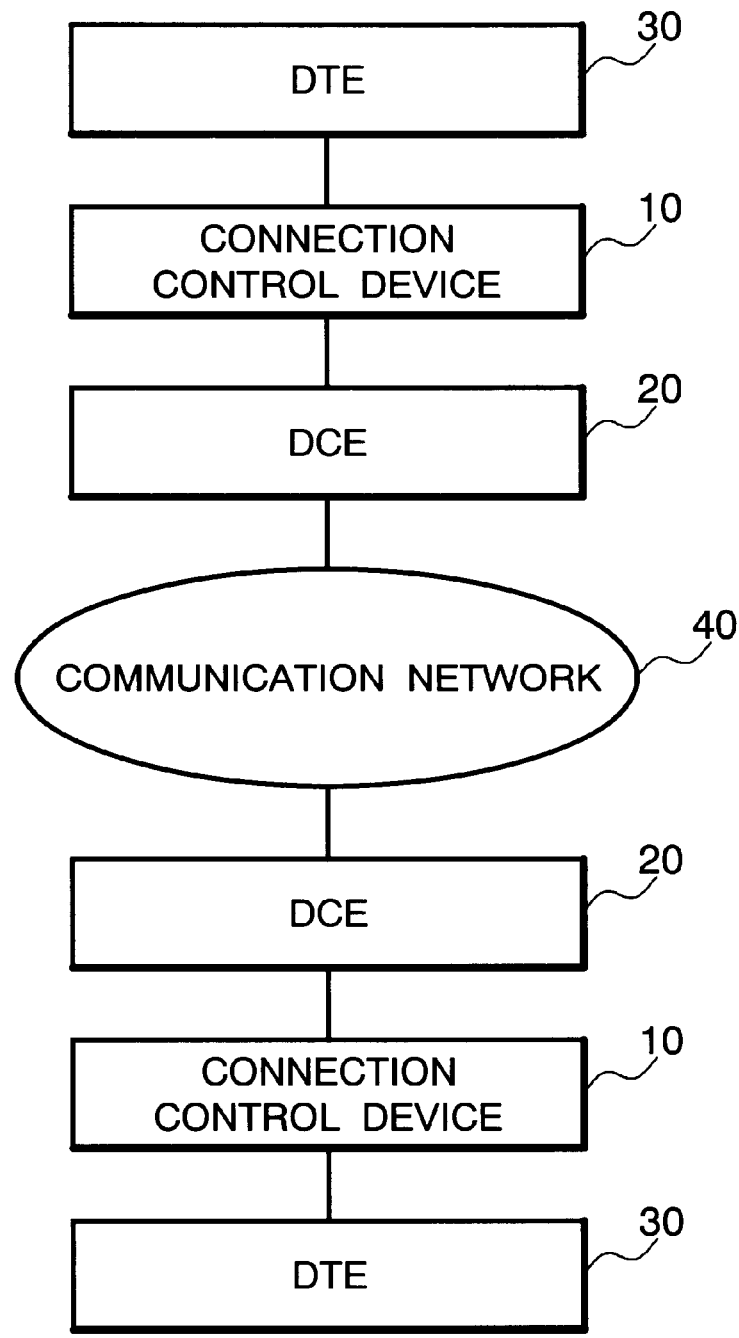
FIG. 2 is a block diagram showing a structure of one embodiment of a communication system using the connection control device according to the first embodiment of the present invention.

The connection control device 10 of the present embodiment, as illustrated in FIG. 2, is disposed between a DTE 30 (Data Terminating Equipment) and a DCE 20 (Data Circuit-terminating Equipment) on both parties which conduct communication to control connection states of both the parties in cooperation with a device on the side of the other party of communication.

The DTE 30 is a device for externally transmitting and receiving data through a communication line and has a function of controlling establishment/release etc. of a connection with a communication partner. Many of DTEs have a function of executing data processing, displaying and recording, etc. and among the examples of the DTE 30 are a personal computer and a notebook-sized personal computer.

The DCE 20 is a device for converting a signal processed by the DTE 30 and a signal communicated on a transmission path of a communication line and has a function of controlling connection/release etc. of a physical line. Among the examples of the DCE 20 are a MODEM (modulator and demodulator) for use in transmission through an analog line and a DSU (Digital Service Unit: digital circuit-terminating equipment) for use in transmission through a digital line.

The connection control device 10 is disposed between the DCE 20 for controlling a lower hierarchy in communication such as physical connection and the DTE 30 for controlling a higher hierarchy in communication such as connection to control connection on both parties in cooperation with the connection control device 10 on the side of the other party of communication.

In connection control by this connection control device 10, even when disconnection of a physical line is detected by the DCE 20 during communication or in other cases, by refraining from giving a notification of the disconnection of the physical line to a communication application executed by the DTE 30 (or to the DTE 30 itself), resumption of the communication is waited for without releasing an established connection, and after a re-connection of the physical line, the communication is resumed again by the waiting connection.

In addition, every time a connection is newly established, information about a communication partner and about connections is in advance recorded in the connection control device 10 on both sides of a communication source and a communication destination which conduct communication. Then, holding the records after a disconnection of a physical line enables confirmation of a right communication partner.

Although connection states of both sides conducting communication in a common communication system are conventionally only two kinds, a release state which is a state where a connection yet to be established is released and a communication state which is a communicable state where both sides are connected to establish a connection, use of the connection control device 10 enables a communication system to newly handle a wait state which is a state of waiting for resumption of communication while holding a connection.

In this wait state, a communication application of the DTE 30 (or the DTE 30 itself) on both sides conducting communication is allowed to execute the same processing without any constraints as that in a case where a physical line is connected. More specifically, in a case of again transmitting data, instructions or the like from one side to the other at the wait state, connection of a physical line is again made at that time to conduct communication by the held connection, which realizes pseudo environments similar to those in a case where physical lines on both sides conducting communication are connected. Thus, an established connection is maintained as it is on a pseudo line made by the connection control devices 10 on both sides which conduct communication.

FIG. 5 is a state transition diagram of connection states of a communication system using the connection control device 10 according to the present embodiment.

The connection control device 10, as illustrated in FIG. 5, processes state transitions such as "new connection", "disconnection to end", "temporary disconnection", "restoration" and "disconnection to release" among the three kinds of connections states, "release state", "communication state" and "wait state".

"New connection" is processing of establishing a connection by connecting a physical line in order to newly start communication, which makes a transition from the release state to the communication state. New connection is executed, for example, when a line connection is made to a communication partner by means of the DCE 20 upon receiving a connection request by a higher-order data communication protocol transmitted by the DTE 30 and when the DCE 20 receives a connection request from a communication partner.

"Disconnection to end" is processing of releasing a connection to disconnect a physical line in order to end communication, which makes a transition from the communication state to the release state. Disconnection to end is executed, for example, when a line disconnection is made by means of the DCE 20 upon receiving a disconnection request by a higher-order data communication protocol transmitted by the DTE 30 and when the DCE 20 receives a disconnection request from a communication partner.

"Temporary disconnection" is processing of stopping communication while holding a connection, which makes a transition from the communication state to the wait state. Temporary disconnection is executed, for example, when at the communication state, a physical line is abruptly disconnected due to defects in communication etc. and when the connection control device 10 senses that a state where no data transmission and reception lasts long to execute processing of disconnecting the physical line for saving communication charges, releasing communication resources, etc.

As described above, temporary disconnection, which is conducted at a disconnection of a physical line or when the line is abruptly disconnected, is processing of waiting for resumption of communication without releasing an established connection by refraining from notifying a communication application executed by the DTE 30 (or the DTE 30 itself) of a disconnection of a physical line.

"Restoration" is processing of resuming waiting communication, which makes a transition from the wait state to the communication state. Restoration is executed, for example, when the DTE 30 starts data transmission to a communication partner and when the DTE receives a re-connection of a physical line from the communication partner and receives data transmitted by the communication partner.

Since in the wait state, a connection is maintained on a pseudo line established by the connection control devices 10 on both sides which conduct communication, temporary disconnection can be considered also as processing of switching from an actual physical line to a pseudo line and restoration can be considered also as processing of switching from a pseudo line to an actual physical line.

"Disconnection to release" is processing of canceling waiting for resumption of communication to abandon a waiting connection at the wait state, which makes a transition from the wait state to the release state. Disconnection to release is executed, for example, at the reception of an instruction to disconnect a line and end communication from the DTE 30 at the wait state and at the cancellation of wait because the wait state lasts longer than a time predetermined as a waiting time.

In the present embodiment, in order to notify a communication application corresponding to the connection control of the present invention or the DTE 30 that waiting or restoration would be executed and in order to execute an instruction to conduct waiting or restoration, provided is the function of transmitting and receiving such connection control instructions and information between the connection control device 10 and the DTE 30 and these processing is executed for the corresponding communication application etc.

In addition, the connection control device 10 of the present embodiment is useful not only in a case where both sides which conduct communication have the same DTE-DCE structure as illustrated in FIG. 2 but also in a case where service for making a connection to a communication line network of other switching system than the line switching system by an internet provider 31 etc. is provided through a telephone line network 41 as illustrated in FIG. 3.

In the example of FIG. 3, while an internet line network 42 receives services through the provider 31 on the flat-rate schedule or with charges according to the amount of data communicated (the number of packets), the telephone line network 41 connecting to the provider 31 is charged according to a connection time. Therefore, with the connection control devices 10 provided on both sides of a user and the provider 31, executing the telephone line disconnection processing while holding a connection, for example, when no data communication state continues saves telephone charges. Also in a case where a radio telephone line is used in the communication with the provider 31, if the communication through the radio telephone line is abruptly disconnected halfway, the established connection is held at a state before the disconnection occurs and will be automatically re-connected by the connection control device 10, thereby enabling preferable data communication without bothering a user by the disconnection and without the need of re-connection work by the user.

FIG. 4 is a diagram for use in explaining a hierarchical structure of communication using the connection control device 10 of the present embodiment.

Hierarchical structure of communication using the connection control device 10 explains functions in communication from lower to upper hierarchies similarly to the hierarchical structure of the OSI or the TCP/IP. Here, description will be simply made with respect to control of a physical line by the DCE 20 in a lower hierarchy, connection control by the connection control device 10 in the middle hierarchy and control of a connection by the DTE 30 in an upper hierarchy.

Data to be transmitted is sent from the DTE 30 which manages an upper hierarchy to a lower hierarchy in order and each hierarchy sequentially adds information necessary for control in each hierarchy to the transmission data as a header, while at the reception side, the DCE 20 receives the transmission data and sequentially sends the same to an upper hierarchy, and each hierarchy eliminates the header added by its corresponding hierarchy on the transmission side, and obtains transmitted information of each hierarchy from the header to receive data. This information transmission and reception at each hierarchy is conducted based on a communication protocol in each hierarchy.

Among methods of transmitting and receiving information about connection control by the connection control devices 10 on both sides are a method of transmitting information with connection control information added into a header as described above and a method in which with no information added to data transmitted by the DTE 20, the connection control device 10 itself transmits information regarding connection control using an independent packet and sends the information, with an identifier or the like indicative of a connection control packet added to a position equivalent to the header. In other words, in the latter method, information regarding connection control is made into not a header of a data packet but one independent packet and in this case, the connection control device 10 does not add a header but generates and transmits a separate packet when information regarding connection control should be transmitted.

Although conventional communication systems involve none of this processing by the connection control device 10, such processing does not conflict with the hierarchical structures of the conventional communication systems but allows the processing by the connection control device 10 to be newly added between an upper hierarchy and a lower hierarchy.

In other words, a communication protocol in the DCE 20 which is a lower hierarchy than the connection control device 10 and the DTE 30 which is a higher hierarchy requires no addition of new functions and constraints in the embodiment of the present invention. The connection control device 10 of the present invention therefore requires other communication device to have none of special functions, so that it can be easily introduced into a conventional communication system.

Although the description has been made of a simple hierarchical structure here, when directly applying to a conventional hierarchical structure, hierarchies of the DTE 30 and the DCE 20 may be further divided into several hierarchies. Information added to transmission data by each hierarchy is not limited to those added at the head as a header but may be error control information and the like added to the end of the transmission data as a trailer.

FIG. 1 is a block diagram showing a structure of the connection control device 10 according to the first embodiment of the present invention.

With reference to FIG. 1, the connection control device 10 of the present embodiment includes a data output end 15, a data input end 16 and a control signal end 17 which are interfaces for connecting with the DTE 30 to communicate information and connects with the DCE 20 for data communication through line switching. The DCE 20 includes a communication port 21 which is an interface for connecting to a communication line such as a telephone line and in some cases connects with a radio equipment (e.g. portable phone) providing a physical line through the communication port 21 to conduct communication.

The data output end 15 and the data input end 16 transmit and receive communication data etc. to and from the DTE 30 and the control signal end 17 communicates information and instructions regarding connection control with the DTE 30. Although the control signal end 17 conducts transmission and reception of signals of a connection request, a disconnection request, etc. sent by the communication application etc. of the DTE 30, in particular when the communication application of the DTE 30 or the DTE 30 side is adapted to transmission and reception of information about connection control unique to the present invention, the control signal end 17 can be also used for transmitting and receiving these information.

The connection control device 10 includes a control unit 11, a control information storage unit 12, a frame determination unit 13 and a timer 14.

The control unit 11 processes connection control of the connection control device 10. More specifically, the unit 11 has a function of monitoring a line state, intermediating, monitoring and controlling data transmitted from the DCE 20 and the DTE 30, exchanging information and instructions with the connection control device 10 of a communication partner as control messages, and for communicating a control message with the connection control device 10 of this communication partner, generating data of the control messages, a function of forming a frame having a control message and a function of transmitting and receiving a control message and analyzing the received control message.

With these functions, the control unit 11 requests control to the DCE 20 in response to a disconnection request and a connection request from the DTE 30 or a connection request etc. through the control signal end 17, as well as generating a control message when necessary and supplying the same to the DCE 20 in order to transmit the message to the connection control device 10 of the communication partner.

The control information storage unit 12 stores information necessary for communication and control of connection with the connection control device 10 of the communication partner.

FIG. 6 is a diagram showing one example of the control information storage unit 12 according to the present embodiment. In the present embodiment, stored is information as a pair of a user identifier CID (Communication Identifier) of a communication partner and a connection destination telephone number as illustrated in FIG. 6. The information stored in the control information storage unit 12 is used, at the execution of a transition of each of the connection states or the like (or when a transition is executed), in the collation with information of the communication partner by the exchange of a control message with a communication partner, thereby determining whether the communication partner is a right partner. For example, the information is possibly used in collation with information of a communication partner at the time of restoration from the wait state to determine whether the party is a right communication partner waiting.

The frame determination unit 13 receives transmission data from a connection partner supplied from the DCE 20 and interprets a frame structure from the received data based on a frame separation character string etc. as illustrated in FIG. 4 to identify necessary information. Hereinafter, this processing is referred to as frame processing.

A protocol identifier contained in a frame indicates whether it is a frame used by a higher-order communication protocol or it is a control message processed by the control unit 11, from which identifier a processing destination is determined to supply data sent from the DCE 20 to the connection control device 10 rightly to each of the control unit 11 and the data output end 15.

The timer 14, which is for determining a lapse of a fixed time, determines whether no data transmission state lasts longer than a fixed time period in succession or whether the wait state lasts longer than a fixed time period in succession. For this purpose, the timer 14 measures a time lapse, with an end time of transmission and reception of each data or a time when a disconnection of a physical line is detected as a start point and the timer is started or reset based on the control of the control unit 11 or the like. The timer 14, upon being started or reset, counts time from "0" and when a certain time set has lapsed, notifies the control unit 11 of time-up.

The DCE 20 conducts control and monitoring regarding a communication line such as telephone line through the communication port 21 and conducts data transmission with the connection control device 10 of the connection partner. The DCE 20 gives a notification of information regarding connection of a communication line etc. to the control unit 11 and sends communication data to the frame determination unit 13.

Next, with reference to the figures, operation of the present embodiment will be described in detail.

The control connection device 10 according to the present invention conducts communication with the connection control device 10 having the same functions. In the following, description will be made in succession with respect to operation of the connection control device 10 on the side of starting one operation (e.g. connection) and operation of the connection control device 10 on the reception side.

Operation of the connection control device 10 of the present embodiment controls processing of a transition of connection states such as "new connection", "disconnection to end", "temporary disconnection", "restoration" and "disconnection to release" as illustrated in FIG. 5 and further controls processing of "data transmission" at the communication state. "Data transmission" is processing of transmitting and receiving information to and from a communication partner at the communication state and its connection state remains the communication state to make no transition.

In addition, the control unit 11 has data of a status value indicative of a current connection state and data of the status value is updated as a connection state makes a transition.

Operation of a new connection will be described.

Figure 8:
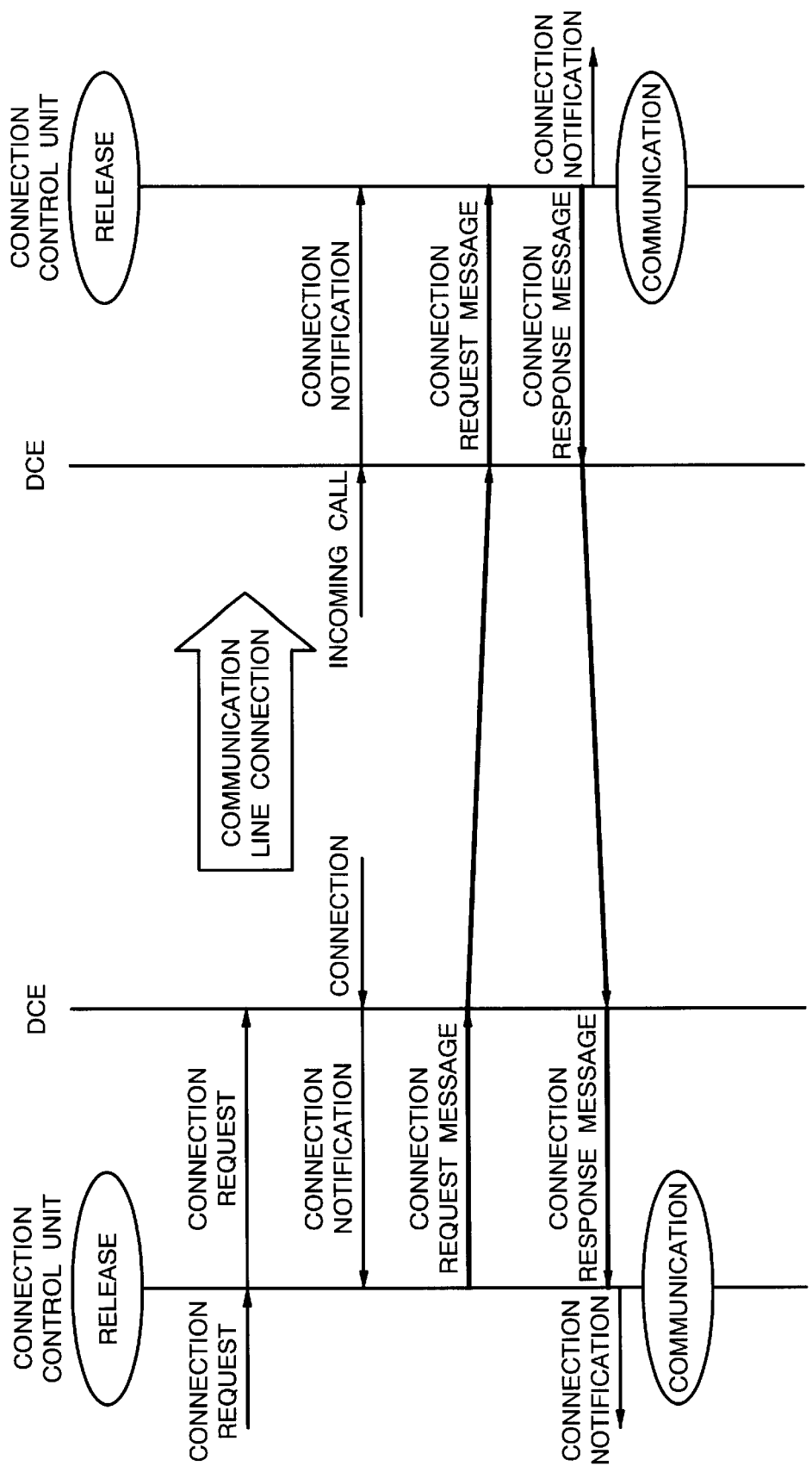
FIG. 8 is a sequence diagram for use in explaining operation of new connection according to the first embodiment of the present invention.

FIG. 8 is a sequence diagram for use in explaining operation of a new connection according to the present embodiment. Initial state is the release state which makes a transition to the communication state by the new connection.

First, description will be made of operation of the connection control device 10 on the side which starts a new connection.

First, at the start of data communication, the connection control device 10 is supplied with a line connection request to the control unit 11 from the DTE 30 through the control signal end 17. The control unit 11 having received a line connection request at the release state controls the control information storage unit 12 to store a connection destination telephone number contained in this connection request and requests a connection of a communication line such as telephone line from the DCE 20.

For setting up a connection with the connection control device 10 of the party to be connected through the communication port 21, the DCE 20 negotiates with the DCE 20 of the connection control device 10 of the connection partner. Upon completion of the negotiation, the DCE 20 notifies the control unit 11 of the completion of a connection of a physical line.

After the connection of the physical line is completed, the control unit 11 generates a connection request message and transmits the same to the connection control device 10 of the connection partner through the DCE 20 and the communication port 21. This operation enables recognition of connection states to be agreed with each other at the connection control device 10 on this side and at the connection control device 10 of the connection partner.

FIG. 7 is a diagram showing a control message according to the present embodiment.

With reference to FIG. 7, a connection request message of the present embodiment is a message including a protocol identifier, a kind of message (connection request) and a telephone number of the requesting side.

Description will be next made of operation of the connection control device 10 on the side which receives a new connection.

At a time when the negotiation with the DCE 20 is completed, the connection control device 10 on the side of receiving a connection notifies the control unit 11 on its side that a physical line connection has been made. The control unit 11 having received the notification waits for reception of a control message for a connection request.

Upon receiving data from the communication port 21 after the connection, the DCE 20 supplies the data to the frame determination unit 13 and the frame determination unit 13 conducts frame processing of the received data to determine based on a protocol identifier included in the frame whether the data is a control message to be handled by the control unit 11 or whether the data is to be supplied to the DTE 30 through the data output end 15 as user data. When a connection request message is received, therefore, the data is sent to the control unit 11 by the frame determination unit 13.

Upon receiving the connection request message, the control unit 11 obtains a partner's telephone number from the message. The control unit 11 assigns a user identifier CID and stores the CID together with the obtained partner's telephone number in the control information storage unit 12. This CID is used at the restoration processing for confirming that the control message of the connection partner is one from the right communication partner.

Next, the control unit 11 generates a connection response message and transmits the same through the DCE 20 and the communication port 21. With reference to FIG. 7, a connection response message of the present embodiment is a message including a protocol identifier, a kind of message (connection response) and CID.

When a connection response message is sent from the DCE 20, a status value held by the control unit 11 is updated from the release state to the communication state.

Next, description will be again made of the connection control device 10 on the side which has sent the connection request. The connection control device 10 having transmitted the connection request message is waiting for reception of a connection response message from the connection control device 10 of the connection partner.

As described above, upon receiving data through the communication port 21, the DCE 20 supplies the data to the frame determination unit 13 and the frame determination unit 13 allots received data to supply either to the data output end 15 or the control unit 11. As a result, the connection response message is sent to the control unit 11.

Upon receiving the connection response message, the control unit 11 extracts a CID from the message, stores the same in the control information storage unit 12 and gives a notification of connection completion to the DTE 30 through the control signal end 17 to update its holding status value from the release state to the communication state.

By the foregoing procedure, transition of the connection state from the release state to the communication state is completed to enable communication.

The control unit 11 starts the timer 14 as this transition to the communication state is made. When a preset time has passed without stopping or resetting halfway, the timer 14 notifies the control unit 11 to that effect. Resetting every time data transmission and reception ends enables the timer 14 to determine whether no data transmission and reception state lasts longer than a fixed time.

Operation of data transmission will be next made.

Figure 9:
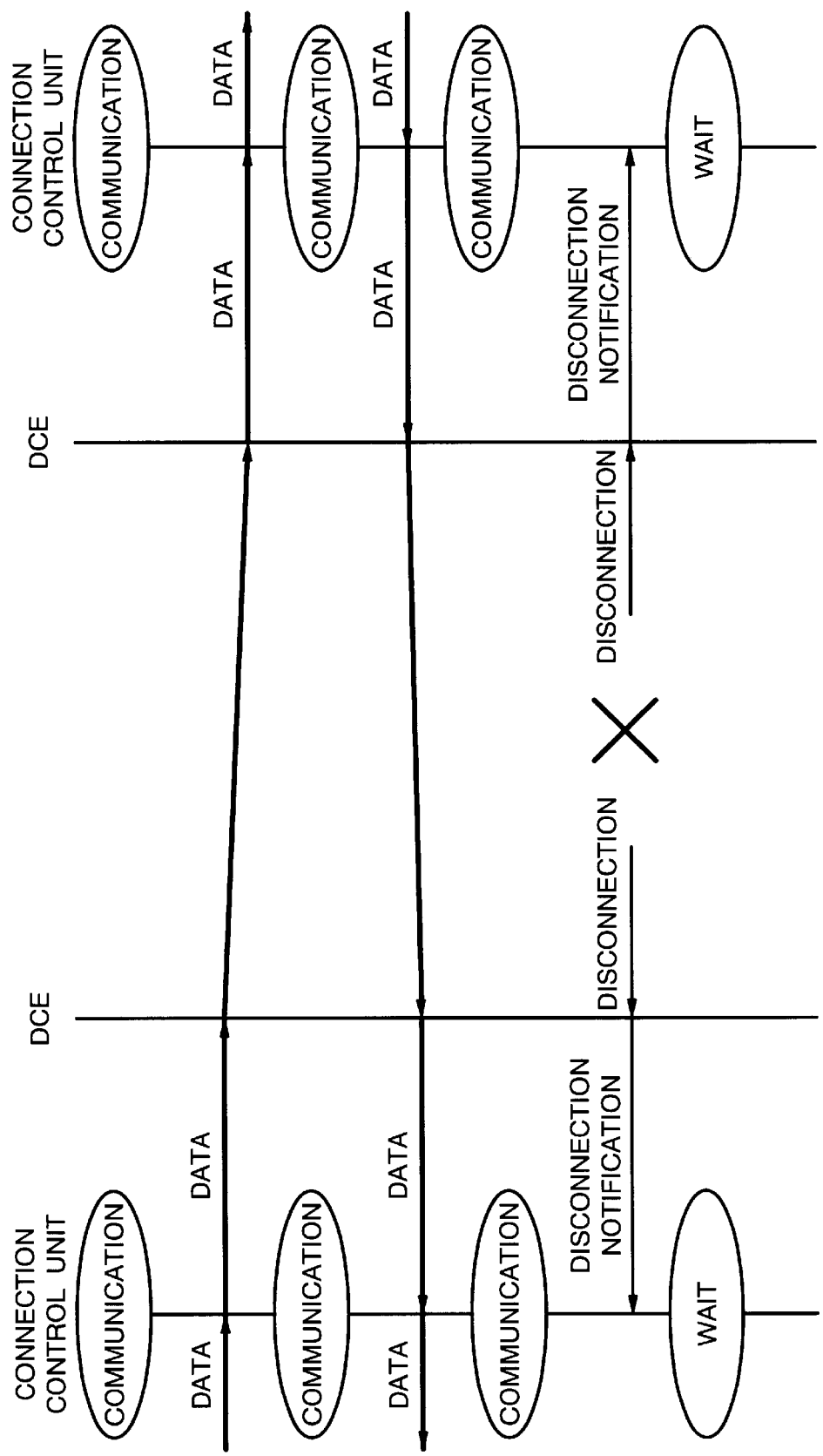
FIG. 9 is a sequence diagram for use in explaining operation of data transmission and temporary disconnection according to the first embodiment of the present invention.

FIG. 9 is a sequence diagram for use in explaining operation of data transmission and temporary disconnection according to the first embodiment of the present invention. Upper part of FIG. 9 shows a data transmission sequence which will be referred to here. Data transmission involves no transition of a connection state and is operation conducted at the communication state.

In the communication state, when the DTE 30 starts data transmission to send user data to the connection control device 10 through the data input end 16, the control unit 11, for transmitting the data to the connection control device 10 of the connection partner, sends the data to the DCE 20 and resets the timer 14.

The DCE 20 transmits the user data to the connection control device 10 of the connection partner through the communication port 21.

At the connection control device 10 on the reception side, the user data received at the DCE 20 is sent to the frame determination unit 13 to reset the timer 14.

As mentioned above, the frame determination unit 13 on the reception side conducts frame processing and determines based on information of a protocol identifier included in the frame whether the data is user data for use in a higher-order communication protocol or it is a control message to be handled by the control unit 11 and when the data is the former one, sends the data to the data output end 15 and when it is the latter one, sends the data to the control unit 11. In this case, since the data is user data, it is sent to the DTE 30 through the data output end 15. The user data from the data output end 15 is processed and used by a higher-order communication protocol such as the PPP or the TCP/IP.

Next, operation of a temporary disconnection will be described.

Initial state is the communication state which makes a transition to the wait state by this temporary disconnection.

Temporary disconnection is executed when line-down happens due to deterioration of radio propagation environments or the like and when a fixed time when no data communication is made has lapsed.

In the former case where line-down occurs, abrupt line disconnection is sensed by the connection control devices 10 on either side which conducts communication and processing on both sides are common.

In the latter case, different processing is executed at the connection control device 10 on the side which conducts temporary disconnection of the line actively due to time-out of the timer 14 and at the connection control device 10 on the side of receiving the temporary disconnection.

First, description will be made of operation to be executed in a case where line disconnection is abruptly sensed when line-down occurs or the like. This operation is described in the lower sequence of FIG. 9.

Upon recognizing that the line at the communication port 21 is abruptly disconnected, the DCE 20 notifies the control unit 11 to that effect.

The control unit 11 having been notified of the line disconnection resets the timer 14 and updates the status value from the communication state to the wait state.

At this time, no notification of line disconnection is given through the control signal end 17 to the DTE 30. As a result, although at the wait state, the communication line is actually disconnected, the DTE 30 in a higher hierarchy of the communication recognizes that the physical line is still connected. In a case where the DTE 30 or a communication application used is adapted to the connection control of the present invention, this temporary disconnection may be notified.

In the present embodiment, line disconnection at the communication state without exchange of control messages between the connection control devices 10 occurs either when the line disconnection is made due to failure of a radio transmission path etc. or when the connection control device 10 of the connection partner executes a temporary disconnection without notifying a control message, and in such a case therefore, temporary disconnection is executed to make a transition to the wait state.

Figure 10:
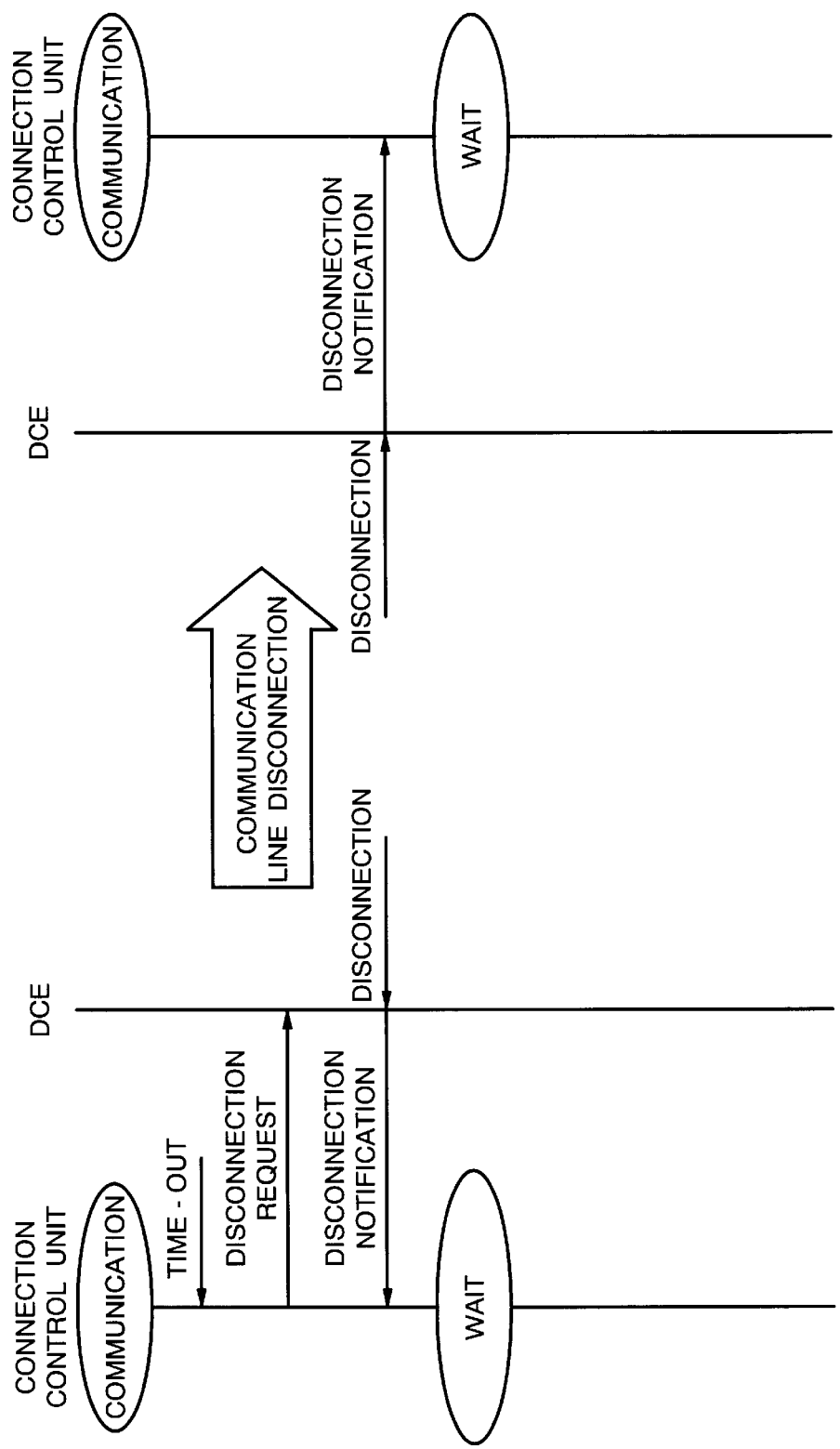
FIG. 10 is a sequence diagram for use in explaining operation of temporary disconnection according to the first embodiment of the present invention.

Description will be next made of line disconnection due to time-out of the timer 14. FIG. 10 is a sequence diagram for use in explaining operation of executing temporary disconnection due to time-out in the present embodiment.

The timer 14 is reset at every data transmission and reception, and when no data transmission and reception is conducted for a period longer than a fixed time set, senses the time-lapse and gives a notification to the control unit 11.

Upon receiving the notification of a fixed time lapse from the timer 14, the control unit 11 resets the timer 14 and instructs the DCE 20 on line disconnection.

The DCE 20 having been instructed to conduct a line disconnection disconnects the line through the communication port 21. When the line disconnection is confirmed, the DCE 20 notifies the control unit 11 of the completion of the line disconnection. The control unit 11 makes a transition of the status value from the communication state to the wait state.

Thus, temporary disconnection due to time-out is executed to transfer to the wait state.

Next, restoration operation will be described.

Figure 11:
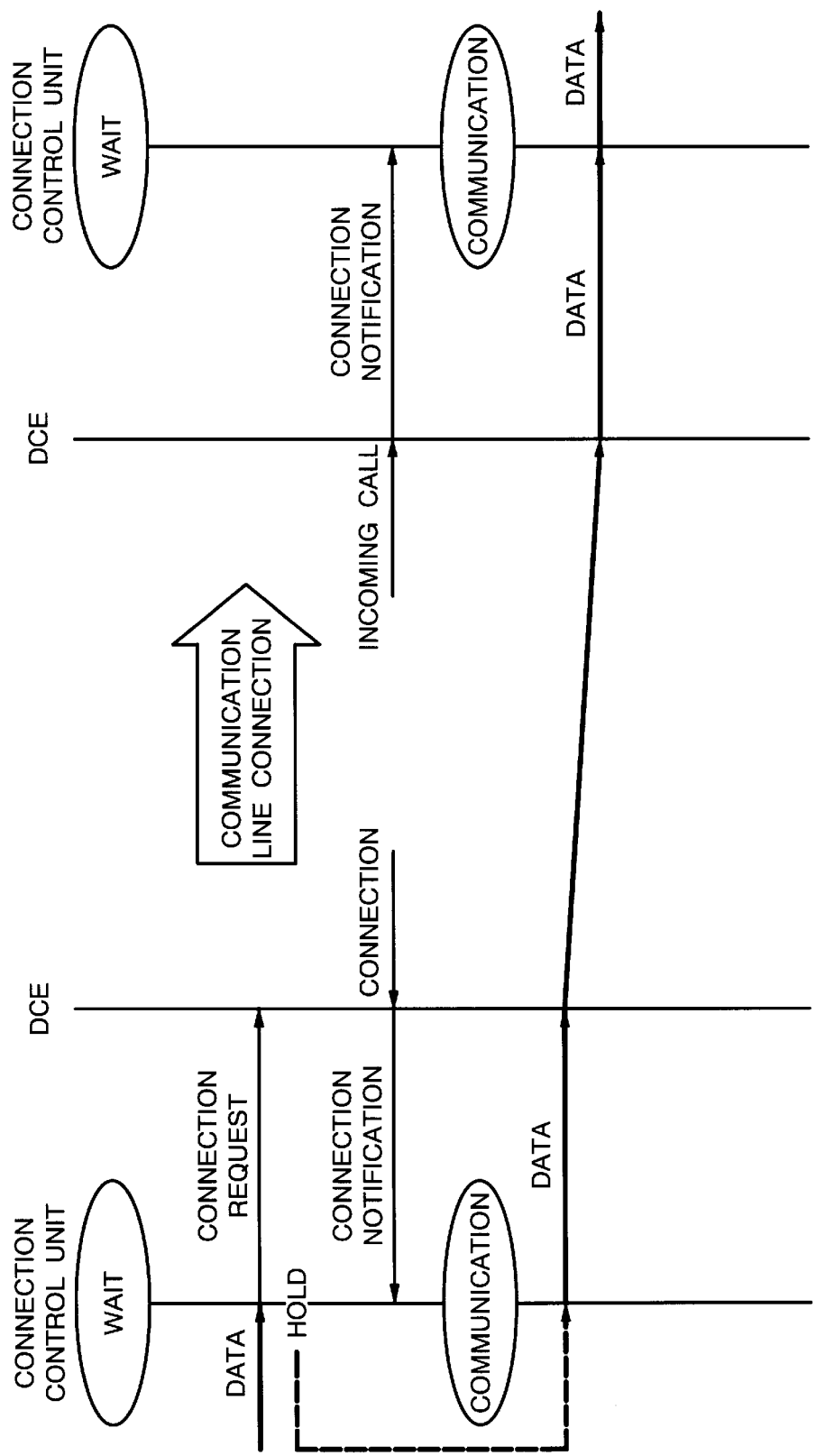
FIG. 11 is a sequence diagram for use in explaining restoration operation according to the first embodiment of the present invention.

FIG. 11 is a sequence diagram for use in explaining restoration operation of the present embodiment. Initial state is the wait state which makes a transition to the communication state as a result of this restoration processing.

Also at the wait state, since there is no special constraints on the execution of communication similarly to the case where a physical line is connected, the DTE 30 is allowed to start data transmission freely.

This is because the connection control device 10 executes restoration processing when receiving user data from the DTE 30 through the data input end 16 at the wait state, which processing is realized by holding the user data and automatically re-establishing a connection to transmit the user data.

First, the control unit 11 holds the user data from the DTE 30 and instructs the DCE 20 to establish a line connection.

The DCE 20 conducts processing of line connection with this waiting communication partner through the communication port 21, confirms the line connection and notifies the control unit 11 of the connection.

The control unit 11 having been notified the line connection updates the status value from the wait state to the communication state and transmits the held user data from the DCE 20 to the connection control device 10 of the connection partner to reset the timer 14.

On the side of the communication partner which receives the user data, upon receiving an incoming call through the communication port 21, the DCE 20 notifies the control unit 11 in the connection control device 10.

Upon receiving the notification of the incoming call at the wait state, the control unit 11 updates the status value from the wait state to the communication state and also sends the user data transmitted from the communication partner to the DTE 30 as reception data of the waiting connection.

Through the foregoing procedure, the transition of the connection state from the wait state to the communication states is completed to execute communication.

Next, operation of disconnection to end will be described.

Figure 12:
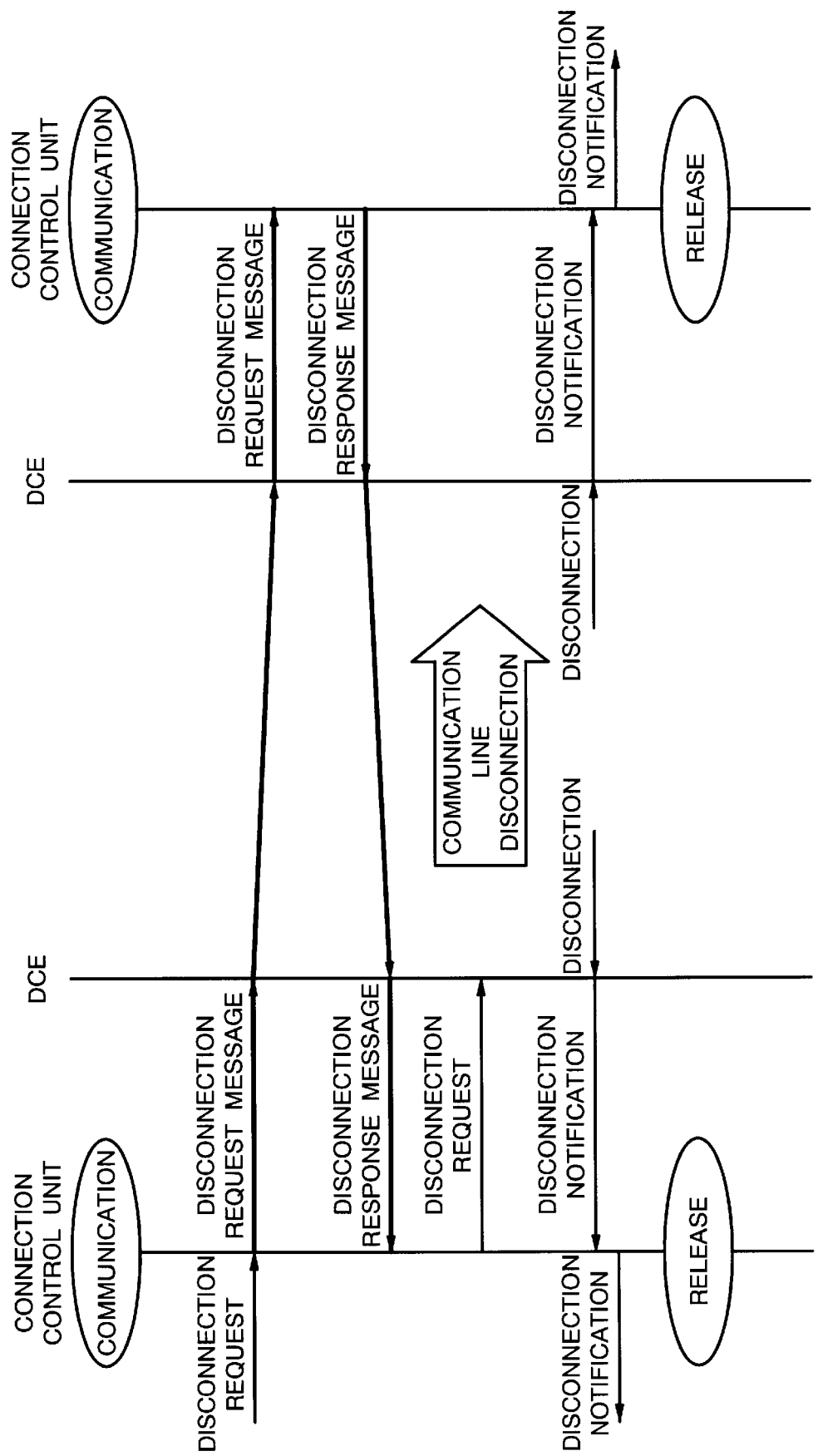
FIG. 12 is a sequence diagram for use in explaining operation of disconnection to end according to the first embodiment of the present invention.

FIG. 12 is a sequence diagram for use in explaining operation of a disconnection to end according to the first embodiment of the present invention. Initial state is the communication state which makes a transition to the release state by a disconnection to end.

The control unit 11 conducts disconnection processing when a line disconnection request is sent through the control signal end 17. The control unit 11 generates a disconnection request message and transmits the same through the DCE 20 to the connection control device 10 of the connection partner.

With reference to FIG. 7, a disconnection request message of the present embodiment is a control message including a protocol identifier, a kind of message and a CID. The CID is extracted from the control information storage unit 12 and used.

After the transmission of the disconnection request message, wait for transmission of a disconnection response message from the connection control device 10 of the connection partner.

In the connection control device 10 on the side of the communication partner, upon receiving the disconnection request message, the control unit 11 generates a disconnection response message and returns the same through the DCE 20 and the communication port 21. In addition, user data applied to the data input end 16 after the reception of this disconnection request message is abandoned. Then, the control unit 11, after the transmission of the disconnection response message, waits for the connection control device 10 of the connection partner to disconnect the line. When the disconnection is recognized by the DCE 20 through the communication port 21 and notified to the control unit 11, a notification that the line has been disconnected is given to the DTE 30 through the control signal end 17 to update the status value from the communication state to the release state.

Through the foregoing procedure, transition of the connection state from the communication state to the release state is completed to finish communication.

Next, operation of a disconnection to release will be described.

Initial state is the wait state which makes a transition to the release state upon disconnection to release. Disconnection to release is executed in the following two cases.

One is a case where a user ends communication at the wait state. This is the case where a line disconnection request is sent from the DTE 30 through the control signal end 17.

Another is a case where the line is automatically disconnected when the state of waiting for line disconnection lasts longer than a certain time. In this case, when the timer 14 detects that the wait state lasts longer than a fixed time, the control unit 11 instructs the DCE 20 to make a disconnection and automatically conducts disconnection processing by itself.

In either case, for the disconnection to release, one method is, after once line connection is established and a disconnection request/response message is exchanged, making a disconnection to make a transition to the release state and the other is immediately making a transition to the release state without establishing a connection.

In the former method, similarly to restoration operation, line connection is made and upon receiving a notification of a line connection, disconnection request message exchanging and disconnection processing is immediately conducted. In this case, the states of the control units 11 of both the connection control devices 10 coincide with each other.

In the latter method, without giving a notification to the connection control device 10 of the communication partner, a notification of line disconnection is given to the DTE 30 through the control signal end 17 to enter the release state, whereby the connection control device 10 of the communication partner remains in the wait state. Because thus occurs a case where connection states of the connection control devices 10 on both sides are recognized differently, there might occur a case, for example, where no communication is possible from the connection control device 10 in the wait state to the connection control device 10 of the communication partner which conducts restoration operation because the latter device is already at the release state.

In an embodiment which adopts the latter method, therefore, in order to cope with such a problem, it is preferable to set a time in which the wait state is continued in advance and automatically conduct processing of making a transition to the release state when the set time has passed after entering the wait state.

Next, the second embodiment of the present invention will be described.

Although the first embodiment has been described with respect to an example of connection control between devices conducting one-for-one communication, in a dial-up server and the like for making a connection to the internet, one server device will communicate with a plurality of clients. Also in this case, providing one server device with the functions of the connection control device 10 as described in the first embodiment in the plural simultaneously enables one connection control device on the server device side to conduct connection control for the connection control devices 10 of a plurality of clients.

In this case, however, for better adapting to the functions of a server device of the internet etc., more efficient structure is demanded than that simply has a plurality of connection control devices 10.

For example, possible arrangement are allowing a client to make a new connection to a communication partner and the server side to only accept an incoming call, allowing only a client to execute a temporary disconnection with a communication partner due to time-out etc. at the connection state, and allowing only a client to make a re-connection with a communication partner and execute restoration processing at the wait state.

In the second embodiment, description will be made of an application of the present invention to a server connection control device as a connection control device for conducting connection control of a server device which communicates with a plurality of users.

Figure 13:
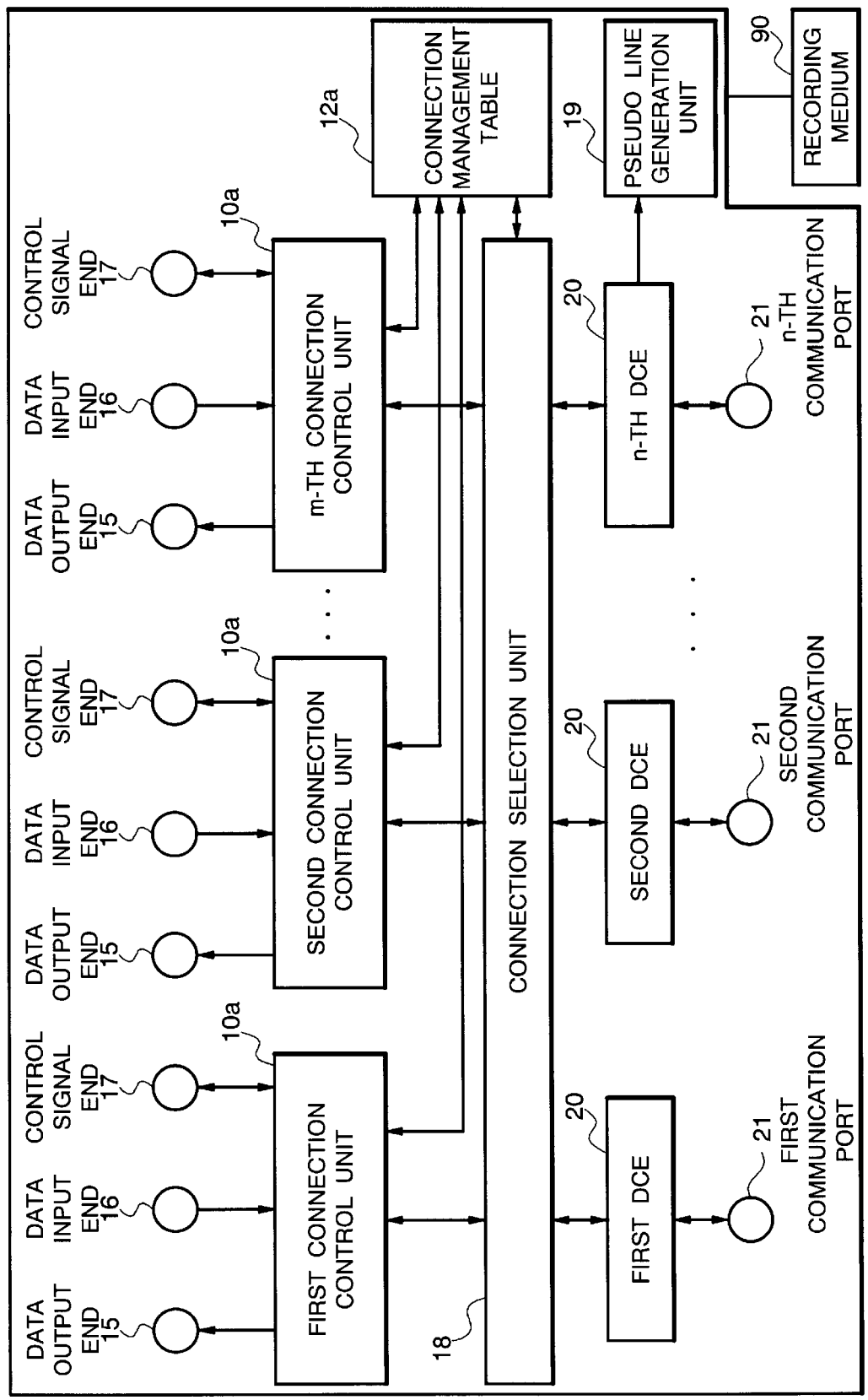
FIG. 13 is a block diagram showing a structure of a server connection control device according to a second embodiment of the present invention.

FIG. 13 is a block diagram showing a structure of a server connection control device 100 according to the present embodiment.

Although the connection control device 10 which conducts communication with the server connection control device 100 is the same in structure as the connection control device 10 of FIG. 1 described in the first embodiment, but has a different function in restoration operation.

In addition, for accommodating a plurality of connection control devices 10, the server connection control device requires a unit for accommodating a plurality of lines, that is, a plurality of communication ports and DCEs.

With reference to FIG. 13, the server connection control device of the present embodiment includes a connection selection unit 18, a connection management table 12a and a pseudo line generation unit 19 and further includes as many DCEs 20 and communication ports 21 as the number of corresponding clients as communication parties (or the expected number of clients being simultaneously connected) in advance. The connection control device is further provided with a function of realizing the functions of a connection control unit 10a as a program, and generates a new connection control unit 10a according to a new connection of a client and releases the connection control unit 10a in response to the end of communication. Each of the generated connection control units 10a executes the same processing as that of the connection control device in the first embodiment independently from each other. In FIG. 13, a number m, from first to m-th, of the connection control units 10a are generated and a number n, from the first to the n-th, of the DCEs 20 and the communication ports 21 are connected with each other as a pair of the same number. Each connection control unit 10a has a data output end 15, a data input end 16 and a control signal end 17 for the connection with the server device.

The connection selection unit 18 provided between the respective DCEs 20 and connection control units 10a refers to the connection management table 12a to receive new reception data by means of an appropriate control unit 10a and transmit new transmission data through an appropriate DCE 20 selected. The connection selection unit 18 also processes a control message.

The pseudo line generation unit 19, when a line connection is newly made, generates a new connection control unit 10a to be used and appropriately initializes the connection control unit 10a. At the end of the communication, the unit 19 ends the connection control unit 10a to release the resource.

The connection management table 12a is a management table regarding a connection being established for use in appropriately correlating each connection control unit 10a and each DCE 20. FIG. 14 is a diagram showing one example of the connection management table 12a according to the present embodiment, and in the present embodiment, as illustrated in FIG. 14, each connection is managed using a table with a user identifier CID, a telephone number, a DCE number and a connection control unit 10a number as one group.

Each connection control unit 10a of the present embodiment stores control information in this connection management table 12a shared by the respective connection control units 10a in place of the control information storage unit 12 built-in in the first embodiment.

FIG. 15 is a block diagram showing a structure of the connection control unit 10a of the present embodiment.

The connection control unit 10a of the present embodiment differs from the connection control unit 10 in the first embodiment in that it fails to internally have the control information storage unit 12 because of centralized management of control information by the external connection management table 12a and fails to have the timer 14 because processing of a temporary disconnection and a connection to release started upon time-out is not executed from the server side, and therefore the control unit 11 and the frame determination unit 13 are provided. Functions of the control unit 11 and the frame determination unit 13 are the same as those of the counterparts in the connection control device 10 of the first embodiment.

Operation of the second embodiment will be described.

Although in the following, description will be made of communication between one communication partner and the server connection control device 100, communication with a plurality of communication partners and connection control are conducted in the same manner.

The server connection control device 100 of the present embodiment is substantially the same as the connection control device 10 of the first embodiment in functions except control of a connection with a plurality of communication partners. However, among the functions of the connection control device 10 of the first embodiment, the function of establishing a line connection upon a connection request through the control signal end 17 and the function of conducting a line disconnection by the control unit 11 in response to a notification from the timer 14 to make a transition from the communication state to the wait state are unnecessary for connection control on the server side which exclusively receives a connection from a client and therefore the server connection control device 100 is assumed to have none of these functions.

Operation to be executed for receiving a new connection will be described.

At the reception of an incoming call from a client through one of the communication ports 21, the DCE 20 corresponding to the communication port having received the incoming call notifies the connection selection unit 18 of the incoming call. Consideration will be here given to a case where the call arrives at the first communication port 21.

The connection selection unit 18, upon receiving the incoming call from the first DCE 20, waits for a message to be sent from the first DCE 20. Here, when determination is made based on a protocol identifier and a kind of the received message that a connection request message is received, the unit 18 instructs the pseudo line generation unit 19 to newly generate and initialize the connection control unit 10a to be used and give a notification of its number.

The pseudo line generation unit 19 newly generates the connection control unit 10a, starts the connection control unit 10a to initialize the connection state to the release state and notifies the connection selection unit of the number. Consideration will be here given to a case where the second connection control unit 10a is generated.

The connection selection unit 18, after writing to the connection management table 12a, a DCE number ("1" here) which has received the connection request message, a connection control unit number ("2" here) notified by the pseudo line generation unit 19 and a telephone number included in the connection request message, gives a notification that a line connection has been established to the connection control unit 10a notified by the pseudo line generation unit 19.

Subsequently, the connection request message is to be supplied. Within the second connection control unit 10a, the same processing as that of the connection control device 10 of the first embodiment is executed and reception data (including user data and a control message) is first sent to the frame determination unit 13.

The control unit 11 obtains the telephone number from the connection message and assigns a CID thereto. The control unit 11 further searches the connection management table 12*a* for a group having a description of the obtained telephone number and writes the CID in the group. Thereafter, the control unit 11 generates a connection response message and sends the message to the connection selection unit 18 for transmitting the same to the client as a communication partner. As a result, the connection state of the second connection control unit 10*a* makes a transition from the release state to the communication state.

The connection selection unit 18 searches the connection management table by using the number "2" of the connection control unit 10*a* which has transmitted the connection response message and transmits the connection response message to the communication partner through the DEC 20 with an appropriate DCE number ("1" here).

Next, data transmission operation will be described.

Data transmission is executed when the connection state of the connection control unit 10*a* used is the communication state. Description will be here made of a case where data is transmitted using the first connection control unit 10*a*.

First, description will be given of data transmission from the side of the first connection control unit 10*a* to a client as a connection partner.

When user data is sent through the data input end 16 of the first connection control unit 10*a* to the control unit 11, the control unit 11 sends the user data to the connection selection unit 18.

The connection selection unit 18 searches the connection management table 12*a* for a DCE number based on the number "1" of the connection control unit 10*a* as a user data sending source. Consideration will be here given to a case where the DCE number is "1".

By sending the data to the first DCE 20, the connection selection unit 18 transmits the data to the connection control device 10 of the client as a connection partner through the first DCE 20 and the first communication port 21.

Next, data transmission at the time of receiving data will be described.

When data is supplied through a communication port, reception processing will be executed.

Description here will be made of a case where data is supplied through the first communication port 21.

Data supplied through the first communication port 21 is received by the first DCE 20 and the first DCE 20 supplies the data to the connection selection unit 18.

Using the connection management table 12*a*, the connection selection unit 18 selects the connection control unit 10*a* corresponding to the first DCE 20 as a data supply source and supplies the data to the selected unit.

Within the connection control unit 10*a*, a receiver of data supply is the frame determination unit 13 which conducts frame processing to determine based on a protocol identifier to which of the data output end 15 and the control unit 11 the data is to be supplied. In the case here, data will be supplied to the data output end 15 because it is user data.

Next, temporary disconnection operation will be described.

When a line of specific one of the communication ports 21 (assumed to be the first communication port 21 here) is disconnected, the first DCE 20 corresponding to the port notifies the connection selection unit 18 of the disconnection and the connection selection unit 18 searches the connection management table 12*a* based on the DCE number "1" of the notifying source for the corresponding connection control unit 10*a*. It is assumed here that the first connection control unit 10*a* is corresponding one.

The notification of the line disconnection is given to the corresponding first connection control unit 10*a*, which is sent to the control unit 11 in the first connection control unit 10*a*.

The control unit 11 notified of the line disconnection searches the connection management table 12*a* based on its own number "1" of the connection control unit number to delete the DEC number "1" written in the relevant group.

Since with this arrangement, the DCE 20 and the communication port 21 are not exclusively used by the control unit 11 for a connection at the wait state, they can be used for other connections, enabling an efficient use of resources of the DCEs 20 and the communication ports 21 provided in the server connection control device 100.

This represents that the number of connection control devices 10*a* which can be accommodated in one server is independent of the number of physical communication ports 21 and the DCEs 20.

The control unit 11 further makes a transition of the state from communication to wait similarly to the first embodiment.

Next, restoration operation will be described.

Restoration operation is conducted in one case of receiving a connection and the other of starting a connection seen from,the server connection control device 100.

First, description will be made of a case where the server connection control device 100 receives a connection for restoration.

When the connection control unit 10*a* in the wait state sets up a line connection, restoration needs to use a control message unlike the first embodiment in which communication devices have a one-for-one relationship.

The control unit 11 supplied with user data through the data input end 16 in FIG. 1 holds the supplied user data and instructs the DCE 20 to set up a line connection.

The DCE 20 executes line connection processing through the communication port 21 and upon confirming the line connection, gives a notification to the control unit 11.

The control unit 11 notified of the line connection generates a restoration request message and transmits the same to the server connection control device 100 through the DCE 20 and the communication port 21.

FIG. 16 is a diagram showing a control message of the present embodiment. With reference to FIG. 16, a restoration request message is a message including a protocol identifier, a kind of message and a CID.

At the time of message generation, the control unit 11 extracts a CID from the control information storage unit and makes the message include the CID.

Thereafter, the control unit 11 waits for a restoration response message from the server connection control device 100, and upon reception, makes a transition of the state from wait to communication and supplies the held user data to the DCE, thereby transmitting the data to the server connection control device 100, and resets the timer 14.

At the server connection control device 100 having received incoming data through the communication port, the DCE (the second DCE 20 here) corresponding to the communication port having received the incoming data (the second communication port 21 here) gives a notification to the connection selection unit 18.

Upon receiving the incoming data, the connection selection unit 18 waits for a message to be sent from the same second DCE 20.

When the message is received and determination is made based on a protocol identifier and a kind of the message that the received message is a restoration request message, the connection selection unit 18 obtains a CID from the message and searches the connection management table 12*a* for the relevant CID.

The unit 18 searches for a connection control unit number ("1" here) in the same group as that of the obtained CID and writes "2" as a message supply source at the DCE number of the group.

The unit 18 notifies the selected first connection control unit 10*a* of the line connection and subsequently supplies a restoration request message.

In the first connection control unit 10*a*, the frame determination unit 13 determines that it is a control message and supplies the message to the control unit 11.

When the control unit 11 generates a restoration response message and supplies the same to the connection selection unit 18, the state makes a transition from wait to communication.

With reference to FIG. 16, a restoration response message is a message including a protocol identifier, a kind of message and a CID.

As to CIDs, the control unit 11 searches the connection management table 12*a* for a CID paired with its own number "1" and extracts the searched CID.

The connection selection unit 18 having received the restoration response message searches the connection management table 12*a* for the DCE number "2", corresponding to the connection control unit number "1" of the message supply source and supplies the message to the second DCE 20 to transmit to the connection control device 10 of the connection partner.

Next, description will be made of a case where the server connection control device starts a connection for restoration.

In the server connection control device 100, when data is supplied through the data input end 21 corresponding to the control unit 11 at the wait state, restoration operation will be conducted.

The control unit 11 having been supplied with user data requests a line connection from the connection selection unit 18.

The connection selection unit 18 selects the DCE number ("3" here) not described in the connection management table 12*a* and makes a request for line connection.

When all the DCEs held by the server connection control device are in use, re-try after a fixed time period or cancel can be made.

The connection selection unit 18 further searches the connection management table 12*a* for a group corresponding to the connection control unit number ("1" here) as a line connection requesting source and writes the selected DCE number ("3" here) in the column of the DCE number of the group.

Then, the connection selection unit 18 requests a line connection from the DCE 20.

The third DCE 20 conducts line connection processing through a communication port and when sensing a connection, notifies the connection selection unit 18 of the connection.

The connection selection unit 18 searches the connection management table 12*a* to select a connection control unit (the first connection control unit 10*a* here) corresponding to the DCE 20 being notified of the line connection and gives a notification of the line connection.

The notification of the line connection is supplied to the control unit 11 in the first connection control unit 10*a*.

For the restoration by the server, exchange of restoration request and response messages may be thereafter conducted or may not be conducted.

When the exchange is made, make a state transition from wait to communication after the exchange of a message and when it is not made, make a state transition from wait to communication at the time of line connection.

These operations should correspond to those of the connection control device 10 of the connection partner.

Operation of disconnection to end will be next described.

When the control unit 11 in the connection control unit (assumed to be the first connection control unit 10*a* here) receives a disconnection request message, the control unit 11 generates a disconnection response message and supplies the same to the connection selection unit 18.

A CID of the disconnection response message is obtained from the connection management table 12*a*.

Thereafter, the first connection control unit 10*a* which has issued the disconnection response message waits for a notification of the line disconnection.

The connection selection unit 18 having been supplied with the disconnection response message searches the connection management table based on the number ("1" here) of the connection control unit as a supply source to select a corresponding DCE (assumed to be the third DCE 20 here).

Using the selected third DCE 20, the unit 18 transmits the disconnection response message to the connection control device 10 of the connection partner.

Upon sensing the disconnection through the third communication port 21, the third DCE 20 notifies the connection selection unit 18.

The connection selection unit 18 selects the number ("1" here) of the connection control unit based on the DCE number "3" through which the disconnection is sensed and gives a notification of the line disconnection.

The control unit 11 having been notified of the line disconnection notifies the control signal end 17 of the line disconnection and deletes all the information (CID, telephone number, communication port number and connection control unit number) regarding itself in the connection management table 12*a* to make a state transition from communication to release.

When a line disconnection request is supplied through the control signal end 17 at the communication state, the control unit 11 generates a disconnection request message and supplies the same to the connection selection unit 18.

CID setting and transmitting manners are the same as those of the above-described disconnection response message.

The control unit 11 waits for a disconnection response message to be returned from the connection control device 10 of the connection partner.

When a disconnection response message is supplied to the control unit 11 of the first connection control unit 10*a* in the same procedure as that of the above-described disconnection request message, the control unit 11 makes a request to the connection selection unit 18 for a line disconnection and waits for completion of the disconnection.

The connection selection unit 18 selects the third DCE 20 corresponding to the first connection control unit 10a by using the connection management table to make a request for line disconnection.

The third DCE 20 executes line disconnection processing through the third communication port 21 and when sensing the disconnection, notifies the connection selection unit 18.

The connection selection unit 18 searches the connection management table 12a for the first connection control unit 10a corresponding to the third DCE 20 having been notified of the disconnection and gives a notification of line disconnection.

The control unit 11 having received the notification of line disconnection notifies the control signal end 17 of the line disconnection and deletes all the information (CID, telephone number, communication port number and connection control unit number) regarding itself in the connection management table 12a to make a state transition from communication to release.

Although no description has been made of operation in an erroneous system, the present invention enables error detection based on disagreement in states and difference in CID confirmed by the control unit 11 to execute operation such as disconnection processing.

Also when the control unit 11 is at the release state, connection operation can be executed upon input of user data directly to the data input end.

In the connection control method of the above-described connection control devices 10 and server connection control devices 100 according to the respective embodiments of the present invention, the control unit 11, the control information storage unit 12, the connection management table 12a, the frame determination unit 13, the connection selection unit 18 and other functions of the connection control device 10 and the server connection control device 100 can be realized not only by hardware but also by loading a computer program having the respective functions into a memory of a computer processing device. The computer program is stored in a storage medium 90 such as a magnetic disc or a semiconductor memory. Then, the program is loaded into the computer processing device from the storage medium 90 to control operation of the computer processing device, thereby realizing the above-described functions.

The connection control devices 10 and the server connection control devices 100 of the respective embodiments of the present invention may be provided within the main body of a functional device of a data circuit-terminating equipment or may be integrated with a data terminating equipment into one unit. They also may be separate devices independent of a data circuit-terminating equipment and a data terminating equipment.

Although the present invention has been described with respect to the preferred modes of implementation and embodiments in the foregoing, the present invention is not necessarily limited to the above-described modes of implementation and embodiments but be variously modified for implementation within the scope of the technical ideas.

As described in the foregoing, the connection control device 10 of the present invention achieves the following effects.

First, wasteful use of radio resources is reduced. The reason is that no line is used from the time of a line disconnection due to deterioration in environments of a radio transmission path or from the time of a line disconnection conducted upon an instruction from the control unit 11 when no data transmission time lasts longer than a fixed time until arrival of a data transmission request or incoming call from the connection control device 10 of a communication destination.

Second effect is that efficient data transfer is possible without user's labor because even when a line is abruptly disconnected, neither a link nor a connection of a data communication protocol is disconnected, thereby eliminating need of trying over again from the beginning. The reason is that the connection control unit refrains from notifying a higher-order data communication protocol of a line disconnection in other cases than that where the unit disconnects a line after exchanging a control message in response to a disconnection request from the higher-order data communication protocol and when data transmission is requested while the line is disconnected, the control unit 11 instructs to conduct a line connection.

Third effect is effective use of device resources such as a communication port and a DCE held in a server connection control device communicable with a plurality of connection control devices 10. The reason is that in the server connection control device, the control unit 11 releases a waiting connection to allow other connection control devices 10 to use device resources such as a communication port and a DCE used and enables the connection control device 10 which executes restoration for the server connection control device to correspond to an appropriate connection control unit by using a connection management table.

Also with this arrangement, one server connection control device is allowed to accommodate more users than device resources held by the server connection control device.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A connection control device for controlling data communication involving set-up of a connection provided on both sides of a communication source and a communication destination to control connection states of both sides in cooperation with a communication partner, each said device controlling communication between a data terminating equipment and a data circuit-terminating equipment on the side the device is disposed, comprising:

connection holding means for holding the state of an established connection after a disconnection of a physical line;

communication resuming means for resuming communication by said connection held after a re-connection of a physical line;

communication resuming means for resuming communication by said connection held after a re-connection of a physical line;

information storage means for storing information of a communication partner and information of a connection with said communication partner; and a control message communication means for transmitting and receiving information of a communication partner and information of a transition of said connection states to and from said communication partner as a control message;

wherein said state of a connection with a communication partner has three kinds of communication states:

a release state indicative of a state where a physical line is disconnected and a connection is released, a communication state indicative of a state where a physical line is connected and a connection is established, and a wait state indicative of a state where a physical line is disconnected while holding a connection, and said connection control device further comprises control means for processing a transition of said connection states;

wherein when receiving an instruction of a kind designated for controlling a connection of communication from said data terminating equipment, said control message communication means transmits said control message indicative of information of the instruction in question to said communication partner prior to execution of the instruction, every time a new connection is established, said information storage means stores information of a communication partner having the connection in question and information of the connection in question, and when at the communication state, a physical line is disconnected without receiving a notification of a communication disconnection by said control message from a communication partner, information stored in said information storage means is held as it is to make a transition to the wait state without executing processing of communication end by a disconnection of a physical line with respect to said data terminating equipment.

2. The connection control device as set forth in claim 1, further comprising a timer for determining a lapse of a fixed time, wherein when no transmission and reception of communication data lasts longer than a fixed time in succession to and from a communication partner to which a physical line is connected, the physical line with said communication partner is disconnected and information stored in said information storage means is held as it is to make a transition to the wait state without executing processing of communication end buy a disconnection of a physical line with respect to said data terminating equipment.

3. The connection control device as set forth in claim 1, wherein when at the wait state, transmission data to be sent to a waiting communication partner is received from said data terminating equipment, a physical line with said communication partner is again connected to transmit said transmission data through a waiting connection stored in said information storage means, thereby making a transition to the communication state.

4. The connection control device as set forth in claim 3, wherein when at the wait state, a connection of a physical line is received from a waiting communication partner to receive data transmitted from said communication partner, communication by a waiting connection stored in said information storage means is resumed to make a transition to the communication state.

5. The connection control device as set forth in claim 1, wherein when at the wait state, said control message communication means receives a control message notifying communication end from said communication partner, information of a waiting connection stored in said information storage means is abandoned to make a transition to the release state.

6. The connection control device as set forth in claim 1, wherein said device is connected to a plurality of data circuit-terminating equipment and further comprises:

server processing means for processing communication of a plurality of lines and a plurality of connections, and management table storage means for centrally storing and managing information of a communication partner and information of a connection with said communication partner with respect to all the connections, said server processing means including:

means for releasing resources of the data circuit-terminating equipment related to the communication in question at a transition to the wait state, and means for referring to said management table storage means to search for said data circuit-terminating equipment not in use, thereby conducting connection control for each of the plurality of connections.

7. The connection control device as set forth in claim 6, wherein when receiving a control message of a restoration request from a communication partner having a waiting connection, said server processing means searches said management table storage means for information of the connection of said communication partner and resumes communication by the searched connection.

8. A connection controlling method of controlling data communication involving set-up of a connection, wherein on both sides of a communication source an a communication destination for controlling connection states of both sides in cooperation with a communication partner, communication is controlled between a data terminating equipment and a data circuit-terminating equipment on each side, and said method comprises the steps of:

connection holding of holding the state of an established connection after a disconnection of a physical line;

communication resuming of resuming communication by said connection held after a re-connection of a physical line, information storing of storing information of a communication partner and information of a connection with said communication partner, control message communicating of transmitting and receiving information of a communication partner and information of a transition of said connection states to and from said communication partner as a control message, wherein said state of a connection with a communication partner has three kinds of communication states:

a release state indicative of a state where a physical line is disconnected and a connection is released, a communication state indicative of a state where a physical line is connected and a connection is established, and a wait state indicative of a state where a physical line is disconnected while holding a connection, and which further comprises the step of controlling of processing a transition of said connection states;

wherein when receiving an instruction of a kind designated for controlling a connection of communication from said data terminating equipment, at said control message communicating step, said control message indicative of information of the instruction in question is transmitted to said communication partner prior to execution of the instruction, every time a new connection is established, information of a communication partner having the connection in question and information of the connection in question are stored at said information storing step, and when at the communication state, a physical line is disconnected without receiving a notification of a communication disconnection by said control message from a communication partner, information stored at said information storing step is held as it is to make a transition to the wait state without executing processing of communication end by a disconnection of a physical line with respect to said data terminating equipment.

9. The connection controlling method as set forth in claim 8, further comprising a timer for determining a lapse of a fixed time, wherein when no transmission and reception of a communication data lasts longer than a fixed time in succession to and from a communication partner to which a physical line is connected, the physical line with said communication partner is disconnected and information stored at said information storing step is held as it is to make a transition to the wait state without executing processing of communication end by a disconnection of a physical line with respect to said data terminating equipment.

10. The connection controlling method as set forth in claim 8, wherein when at the wait state, transmission data to be sent to a waiting communication partner is received from said data terminating equipment, a physical line with said communication partner is again connected to transmit said transmission data through a waiting connection stored at said information storing step, thereby making a transition to the communication state.

11. The connection controlling method as set forth in claim 10, wherein when at the wait state, a connection of a physical line is received from a waiting communication partner to receive data transmitted from said communication partner, communication by a waiting connection stored at said information storing step is resumed to make a transition to the communication state.

12. The connection controlling method as set forth in claim 8, wherein when at the wait state, said control message communicating step receives a control message notifying communication end from said communication partner, information of a waiting connection stored at said information storing step is abandoned to make a transition to the release state.

13. The connection controlling method as set forth in claim 8, wherein with a plurality of data circuit-terminating equipment connected, said method further comprises the steps of:

server processing communication of a plurality of lines and a plurality of connections, and management table centrally storing and managing information of a communication partner and information of a connection with said communication partner with respect to all the connections, said server processing step including the steps of:

releasing resources of the data circuit-terminating equipment related to the communication in question at a transition to the wait state, and referring to said management table storage step to search for said data circuit-terminating equipment not in use, thereby conducting connection control for each of the plurality of connections.

14. The connection controlling method as set forth in claim 13, wherein when receiving a control message of a restoration request from a communication partner having a waiting connection, said server processing step searches for information of the connection of said communication partner at said management table storage step and resumes communication by the searched connection.

15. A computer readable memory storing a connection control program for controlling data communication involving set-up of a connection, said computer readable memory being provided on both sides of a communication source and a communication destination for controlling connection states of both sides in cooperation with a communication partner and each said connection control program controlling communication between a data terminating equipment and a data circuit-terminating equipment on each side, wherein said connection control program comprises the steps of:

connection holding of holding the state of an established connection after a disconnection of a physical line, communication resuming of resuming communication by said connection held after a re-connection of a physical line, information storing information of a communication partner and information of a connection with said communication partner, message communicating of transmitting and receiving information of a communication partner and information of a transition of said connection states to and from said communication partner as a control message, wherein said state of a connection with a communication partner has three kinds of communication states:

a release state indicative of a state where a physical line is disconnected and a connection is released, a communication state indicative of a state where a physical line is connected and a connection is established, and a wait state indicative of a state where a physical line is disconnected while holding a connection, and which further comprises the control step of processing a transition of said connection states;

wherein when receiving an instruction of a kind designated for controlling a connection of communication from said data terminating equipment, at said control message communicating step, said control message indicative of information of the instruction in question is transmitted to said communication partner prior to execution of the instruction, every time a new connection is established, information of a communication partner having the connection in question and information of the connection in question are stored at said information storing step, and when at the communication state, a physical line is disconnected without receiving a notification of a communication disconnection by said control message from a communication partner, information stored at said information storing step is held as it is to make a transition to the wait state without executing processing of communication end by a disconnection of a physical line with respect to said data terminating equipment.

16. The computer readable memory storing a connection control program as set forth in claim 15, further comprising a time for determining a lapse of a fixed time, wherein when no transmission and reception of communication data lasts longer than a fixed time in succession to and from a communication partner to which a physical line is connected, the physical line with said communication partner is disconnected and information stored at said information storing step is held as it is to make a transition to the wait state without executing processing of communication end by a disconnection of a physical line with respect to said data terminating equipment.

17. The computer readable memory storing a connection control program as set forth in claim 15, wherein when at the wait state, transmission data to be sent to a waiting communication partner is received from said data terminating equipment, a physical line with said communication partner is again connected to transmit said transmission data through a waiting connection stored at said information storing step, thereby making a transition to the communication state.

18. The computer readable memory storing a connection control program as set forth in claim 17, wherein when at the wait state, a connection of a physical line is received from a waiting communication partner to receive data transmitted from said communication partner,
communication by a waiting connection stored at said information storing step is resumed to make a transition to the communication state.

19. The computer readable memory storing a connection control program as set forth in claim 15, wherein when at the wait state, said control message communication step receives a control message notifying communication end from said communication partner, information of a waiting connection stored at said information storing step is abandoned to make a transition to the release state.

20. The computer readable memory storing a connection control program as set forth in claim 15, wherein said computer readable memory is connected to a plurality of data circuit-terminating equipment and further comprises the steps of:
server processing of processing communication of a plurality of lines and a plurality of connections, and
management table storing of centrally storing and managing information of a communication partner and information of a connection with said communication partner with respect to all the connections,
said server processing step including the steps of:
releasing resources of the data circuit-terminating equipment related to the communication in question at a transition to the wait state, and
referring to said management table storage step to search for said data circuit-terminating equipment not in use, thereby
conducting connection control for each of the plurality of connections.

21. The computer readable memory storing a connection control program as set forth in claim 20, wherein when receiving a control message of a restoration request from a communication partner having a waiting connection, said server processing ste
searches for information of the connection of said communication partner at said management table storage step and resumes communication by the searched connection.

22. A data communication system for conducting data communication involving set-up of a connection, wherein communication control devices are disposed on both sides of a communication source and a communication destination for controlling connection states of both sides in cooperation with a communication partner, each controlling communication between a data terminating equipment and a data circuit-terminating equipment on each side, and said connection control device comprises:
connection holding means for holding the state of an established connection after a disconnection of a physical line;
communication resuming means for resuming communication by said connection held after re-connection of a physical line;
information storage means for storing information of a communication partner and information of a connection with said communication partner; and
control message communication means for transmitting and receiving information of a communication partner and information of a transition of said connection states to and from said communication partner as a control message,
wherein said state of a connection with a communication partner has three kinds of communication states:
a release state indicative of a state where a physical line is disconnected and a connection is released,
a communication state indicative of a state where a physical line is connected and a connection is established, and
a wait state indicative of a state where a physical line is disconnected while holding a connection, and wherein said connection control device further comprises control means for processing a transition of said connection state,
wherein when receiving an instruction of a kind designated for controlling a connection of communication from said data terminating equipment, said control means transmitting said control message indicative of information of the instruction in question to said communication partner prior to execution of the instruction,
every time a new connection is established, said information storage means storing information of a communication partner having the connection in question and information of the connection in question, and
when at the communication state, a physical line is disconnected without receiving a notification of a communication disconnection by said control message from a communication partner, holds information stored in said information storage means as it is to make a transition to the wait state without executing processing of communication end by a disconnection of a physical line with respect to said data terminating equipment.

23. The communication system as set forth in claim 22, wherein said connection control device further comprises a timer for determining a lapse of a fixed time, and wherein said connection control device, when no transmission and reception of communication data lasts longer than a fixed time in succession to and from a communication partner to which a physical line is connected, disconnects the physical line with said communication partner and holds information stored in said information storage means as it is to make a transition to the wait state without executing processing of communication end by a disconnection of a physical line with respect to said data terminating equipment.

24. The communication system as set forth in claim 22, wherein at the wait state, receiving transmission data to be transmitted to a waiting communication partner from said data terminating equipment, said connection control device again connects a physical line with said communication partner and transmits said transmission data through a waiting connection stored in said information storage means to make a transition to the communication state.

25. The communication system as set forth in claim 24, wherein when at the wait state, receiving a connection of a physical line from a waiting communication partner to receive data transmitted from said communication partner, said connection control device resumes communication by a waiting connection stored in said information storage means to make a transition to the communication state.

26. The communication system as set forth in claim 22, wherein when at the wait state, said control message communication means receives a control message notifying communication end from said communication partner, said connection control device abandons information of a waiting connection stored in said information storage means to make a transition to the release state.

27. The communication system as set forth in claim 22, wherein said connection control device is connected to a plurality of data circuit-terminating equipment and further comprises:

server processing means for processing communication of a plurality of lines and a plurality of connections, and management table storage means for centrally storing and managing information of a communication partner and information of a connection with said communication partner with respect to all the connections, said server processing means including:

means for releasing resources of the data circuit-terminating equipment related to the communication in question at a transition to the wait state, and means for referring to said management table storage means to search for said data circuit-terminating equipment not in use, thereby conducting connection control for each of the plurality of connections.

28. The communication system as set forth in claim 27, wherein when receiving a control message of a restoration request from a communication partner having a waiting connection, said server processing means searches said management table storage means for information of the connection of said communication partner and resumes communication by the searched connection.

* * * * *